US007813652B2

(12) United States Patent
Sasaki

(10) Patent No.: US 7,813,652 B2
(45) Date of Patent: *Oct. 12, 2010

(54) OPTICAL PULSE TIME SPREADING DEVICE

(75) Inventor: Kensuke Sasaki, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 753 days.

This patent is subject to a terminal disclaimer.

(21) Appl. No.: 11/433,418

(22) Filed: May 15, 2006

(65) Prior Publication Data

US 2006/0269286 A1 Nov. 30, 2006

(30) Foreign Application Priority Data

May 16, 2005 (JP) ............................. 2005-142368

(51) Int. Cl.
*H04B 10/04* (2006.01)
*H04J 14/00* (2006.01)

(52) U.S. Cl. ........................ 398/190; 398/77; 398/188

(58) Field of Classification Search ............ 398/77–79, 398/89, 188, 190

See application file for complete search history.

(56) References Cited

U.S. PATENT DOCUMENTS

| 7,440,656 | B2 * | 10/2008 | Sasaki et al. | .................. 385/37 |
| 2002/0163696 | A1 * | 11/2002 | Huang et al. | ................ 359/154 |
| 2004/0264965 | A1 * | 12/2004 | Kobayashi et al. | ........... 398/78 |
| 2005/0084266 | A1 * | 4/2005 | Pohjola et al. | ................ 398/77 |
| 2005/0089328 | A1 * | 4/2005 | Nishiki et al. | ................. 398/77 |
| 2007/0223927 | A1 * | 9/2007 | Sasaki et al. | .................. 398/98 |

FOREIGN PATENT DOCUMENTS

JP 2004-228840 A 8/2004

OTHER PUBLICATIONS

"Optical code division multiplexing network", Hideyuki Sotobayashi, Applied Physics, vol. 71, 7.(2002), pp. 853-859.
"Encoder/decoder on planar lightwave circuit for time-spreading/wavelength hopping optical CDMA" Koichi Takiguchi et al., OFC 2002, TuK8, Mar. 2002.

(Continued)

*Primary Examiner*—Nathan M Curs
(74) *Attorney, Agent, or Firm*—Rabin & Berdo, PC

(57) ABSTRACT

The present invention is an optical pulse time spreading device comprising a plurality of optical pulse time spreaders that output an input optical pulse as a series of chip pulses stream that are sequentially arranged time-spread on a time axis in accordance with optical phase code. Each of the optical pulse time spreaders comprises phase control means that supplies a phase difference between adjacent chip pulses. Identification parameters are introduced to realize channel discrimination by changing the phase difference conditions supplied between adjacent chip pulses for each of the phase control means. The phase control means have a structure in which an SSFBG is fixed to the core of the optical fiber, for example. The SSFBG has unit FBGs that are arranged in series in the waveguide direction of the core. The code values of the optical phase code established for the phase control means correspond each one-on-one with each of the unit FBGs.

6 Claims, 8 Drawing Sheets

OTHER PUBLICATIONS

"A 10 Gb/s Optical Code Division Multiplexing Using 8-Chip Optical Bipolar Code and Coherent Detection", Naoya Wada, et al., Journal of Lightwave Technology, vol. 7, No. 10., Oct. 1999.

"Development of planar light wave circuit into optical function device" Koichi Takiguichi, Applied Physics Journal, vol. 72, 11, pp. 1387-1392 (2003).

"Development of Encoder/Decoder of OCDM using a SSFBG" Akihiko Nishiki, et al., Technical Report of IEICE OFT2002-66, (Nov. 2002).

Office Action issued in counterpart Japanese Patent Application No. 2005-142368 on Dec. 1, 2009, with English-language translation.

* cited by examiner

INPUT OPTICAL PULSE

TIME

ENCODED OPTICAL PULSE TRAIN

TIME

ENCODED OPTICAL PULSE TRAIN

TIME

⇩ SUPERPOSITION

AUTOCORRELATION WAVEFORM

TIME

OPTICAL PULSE TIME SPREADING DEVICE

BACKGROUND OF THE INVENTION

1. Field of the Invention

The present invention relates to an encoder that performs time spreading by converting an optical pulse into chip pulses. Further, the present invention relates to an optical code division multiplexing transmission method that is implemented by using the encoder and a device for implementing this method.

2. Description of Related Art

In recent years, the demand for communications has increased rapidly as a result of the spread of the Internet and so forth. High capacity networks have accordingly been completed at high speed by using optical fiber. Further, in order to establish high-capacity communications, an optical multiplexing technology that transmits a plurality of channels' worth of optical pulse signals together via one optical fiber transmission line has been investigated.

As optical multiplexing technology, optical time division multiplexing (OTDM), wavelength division multiplexing (WDM) and optical code division multiplexing (OCDM) have been intensively researched. Among these technologies, OCDM has the merit of flexibility on the operation side, that is, of having no restrictions on the time axis allocated one bit at a time of the optical pulse signals that are transmitted and received in OTDM and WDM and so forth. Further, OCDM has the merit that a plurality of channels can be established in the same time slot on the time axis or a plurality of communication channels can also be established with the same wavelength on the wavelength axis. Further, a plurality of channels can be multiplexed at the same time at the same wavelength to permit high-capacity data communications. In comparison with OTDM and WDM, and so forth, the focus is on the fact that the communication capacity can increase rapidly (See Hideyuki Sotobayashi, 'Optical code division multiplexing network', Applied Physics, Volume 71, 7. (2002) pages 853 to 859, for example).

In the subsequent description, the expression optical pulse signal signifies an optical pulse train reflecting a binary digital signal. That is, an optical pulse train reflecting a binary digital signal in correspondence with the existence and non-existence of optical pulses constituting the optical pulse train on a time axis with respect to an optical pulse train in which optical pulses stand in a row at regular fixed intervals (time interval corresponding to the reciprocal of the frequency corresponding to the bit rate) is an optical pulse signal.

OCDM is a communication method that extracts signals by means of pattern matching by allocating codes (patterns) that are different for each channel. That is, OCDM is an optical multiplexing technology that encodes an optical pulse signal by means of an optical code that is different for each communication channel on the transmission side and which restores the original optical pulse signal by performing decoding by using the same optical codes on the reception side as on the transmission side. An encoder is used to encode the optical pulse signal to convert same into an encoded optical pulse signal and a decoder is used to decode the encoded optical pulse signal to restore same to an optical pulse signal.

As a method for encoding an optical pulse signal to convert same into an encoded optical pulse signal, a time spreading wavelength hopping method that performs encoding by using both time domains and wavelength domains is known (See Koichi Takiguchi, et al., "Encoder/decoder on planar lightwave circuit for time-spreading/wavelength hopping optical CDMA" OFC 2002, TuK8, March 2002, for example). Further, a phase shift keying (PSK) method that performs encoding by spreading the optical pulse signal over time domains is known (See Naoya Wada, et al., "A 10 Gb/s Optical Code Division Multiplexing Using 8-Chip Optical Bipolar Code and Coherent Detection", Journal of Lightwave Technology, Vol. 17, No. 10., October 1999 and Akihiko Nishiki, Hideyuki Iwamura, Hisashi Kobayashi, Satoko Kutsuzawa, Saeko Oshiba 'Development of Encoder/Decoder for OCDM using a SSFBG' Technical Report of IEICE. OFT2002-66, (2002-11), for example).

In encoding using the PSK method, an example in which an encoder the constituent element of which is a Planar Lightwave Circuit (PLC) is used has been reported (See Naoya Wada, et al., "A 10 Gb/s Optical Code Division Multiplexing Using 8-Chip Optical Bipolar Code and Coherent Detection", Journal of Lightwave Technology, Vol. 17, No. 10., October 1999). In PSK, a binary phase code (bipolar code) of codelength 8 is used as the code and a transversal-type optical filter is used as the encoding device. The details of the codelength will be described subsequently.

The transversal-type optical filter comprises a delay line, a variable coupling rate optical coupler, a phase modulation section, and a multiplexing section as principle constituent elements (See Koichi Takiguchi, 'Development of planar light wave circuit into optical function device' Applied Physics Journal, Volume 72, 11, pages 1387 to 1392 (2003), for example). An optical pulse that is input to a transversal-type optical filter in which there are t variable coupling rate optical couplers is demultiplexed to produce (t+1) optical pulses and the phases of the optical pulses are modulated by the phase modulation section in correspondence with the encoded values. The details will be provided subsequently. However, a plurality of optical pulses generated as a result of the optical pulse input to the encoder being dispersed on the time axis are also known as chip pulses.

The respective variable coupling rate optical couplers are linked by delay lines and the respective chip pulses are multiplexed by the multiplexing section after a delay time has been added by the delay lines to generate a series of chip pulses stream, that is, an encoded optical pulse train.

Further, an example in which a Super Structure Fiber Bragg Grating (SSFBG) is used as the constituent element of the encoder has been reported (See Akihiko Nishiki, Hideyuki Iwamura, Hisashi Kobayashi, Satoko Kutsuzawa, Saeko Oshiba 'Development of Encoder/Decoder for OCDM using a SSFBG' Technical Report of IEICE. OFT2002-66, (2002-11)). The SSFBG is constituted by arranging unit Fiber Bragg Gratings (FBG) that are arranged in a row and which correspond one-on-one with code values constituting optical phase code in series in the direction of the optical waveguide. The SSFBG is formed such that unit FBGs in a number equal to the codelength are arranged in a row and established at intervals resulting from the provision of phase shifts that match the code values between the unit FBGs.

As described above, because a passive light element such as an FBG can be used as the phase control means of the encoder, it is possible to deal with higher speeds with respect to the communication rate without the encoding processing being subject to electrical restrictions.

In the subsequent description, suppose that the phase control means used for one channel's worth of encoding is known as an encoder and the device used for a plurality of channels' worth of encoding that integrates a plurality of encoders is known as an encoding device. Further, suppose that the phase control means used for one channel's worth of decoding is known as a decoder and the device for a plurality of channels' worth of decoding that integrates a plurality of decoders is known as a decoding device.

Further, in the subsequent description, an encoder or decoder that is used in the so-called PSK method to perform encoding by spreading an optical pulse signal over time domains is also called an optical pulse time spreader. Further, a device that is constituted by integrating a plurality of optical pulse time spreaders is also called an optical pulse time spreading device.

The operating principles of a case where an optical pulse time spreader that uses an SSFBG is used as an encoder and decoder will now be described with reference to FIGS. 1A to 1E. FIG. 1A shows a time waveform of input optical pulses. FIG. 1E serves to describe an aspect in which an encoded optical pulse train that has been encoded by an encoder is decoded by a decoder.

The input optical pulse shown in FIG. 1A is encoded as a result of being input from an optical fiber 12 to an encoder 10 via an optical circulator 14 and optical fiber 16 as shown in FIG. 1E. The input optical pulse then passes through the optical fiber 18 via the optical fiber 16 and optical circulator 14 once again before being input to a decoder 20 via an optical circulator 22 and optical fiber 24. Further, a cross-correlation waveform is generated as a result of decoding by a decoder 20 and the cross-correlation waveform passes through an optical fiber 26 via the optical fiber 24 and optical circulator 22.

The encoder 10 and decoder 20 shown in FIG. 1E are an SSFBG constituted by arranging four unit FBGs in the waveguide direction of the optical fiber. Here, as an example, the functions of the encoder 10 and decoder 20 will be described by using a four-bit optical code (0, 0, 1, 0). Here, the number of items in the numerical sequence consisting of '0's and '1's that provides the optical code is also called the codelength. In this example, the codelength is 4. Further, the numerical sequence providing the optical code called a code string and each item '0' and '1' of the codelength is also known as a chip. Further, the values 0 and 1 are also called the code values.

The unit FBGs 10a, 10b, 10c, and 10d constituting the encoder 10 correspond with a first chip '0' of the abovementioned optical codes, a second chip '0', a third chip '1', and a fourth chip '0' respectively. The determination of whether the code value is 0 or 1 is the phase relationship of the Bragg reflected light that is reflected by adjacent FBG units.

That is, because the first chip and second chip have an equal code value 0, the phase of the Bragg reflected light reflected by unit FBG 10a corresponding with the first chip and the phase of the Bragg reflected light reflected by unit FBG 10b corresponding with the second chip are equal. Further, because the code value of the second chip is 0 and the code value of the third chip is 1, the two chips have mutually different values. Therefore, the difference between the phase of the Bragg reflected light reflected by unit FBG 10b corresponding with the second chip and the phase of the Bragg reflected light reflected by unit FBG 10c corresponding with the third chip is $\pi$.

Likewise, because the code value of the third chip is 1 and the code value of the fourth chip is 0, the two chips have mutually different values. Therefore, the phase of the Bragg reflected light reflected by unit FBG 10c corresponding with the third chip and the phase of the Bragg reflected light reflected by unit FBG 10d corresponding with the fourth chip is $\pi$.

Thus, because the phases of the Bragg reflected light from the unit FBGs are changed, the specified optical code is also known as 'optical phase code'.

A process in which a cross-correlation waveform is formed as a result of an optical pulse being encoded by an encoder and converted to an encoded optical pulse train and the encoded optical pulse train being decoded by a decoder will be described next. When the single optical pulse shown in FIG. 1A is input from the optical fiber 12 to the encoder 10 via the optical circulator 14 and optical fiber 16, Bragg reflected light from the unit FBGs 10a, 10b, 10c, and 10d is generated. Therefore, suppose that the Bragg reflected light from the unit FBGs 10a, 10b, 10c, and 10d is a, b, c, and d. That is, the single optical pulse shown in FIG. 1A is converted into an encoded optical pulse train as a result of time spreading of the Bragg reflected light a, b, c, and d.

When the Bragg reflected light a, b, c, and d is represented on a time axis, an optical pulse train resulting from arrangement at specified intervals that depend on the method of arranging the unit FBGs 10a, 10b, 10c, and 10d on the time axis through division into four optical pulses is constituted as shown in FIG. 1B. Therefore, an encoded optical pulse train is an optical pulse train that is produced as a result of time-spreading an optical pulse that is input to the encoder as a plurality of optical pulses on a time axis. Although the individual optical pulses arranged through time-spreading on the time axis correspond with the respective chip pulses, in cases where there will be no particular confusion in the subsequent description, the chip pulses are also referred to as optical pulses instead of chip pulses.

FIG. 1B shows an encoded optical pulse train that passes through the optical fiber 18 with respect to the time axis. In FIG. 1B, for the purpose of a quick representation of the encoded optical pulse train, the optical pulses are shown displaced in the vertical axis direction.

The Bragg reflected light of unit FBG 10a is the optical pulse denoted by a in FIG. 1B. Likewise, the Bragg reflected light of FBG 10b, FBG 10c, and FBG 10d are optical pulses denoted by b, c, d respectively in FIG. 1B. The optical pulse denoted by a is an optical pulse that is reflected by the unit FBG 10a closest to the input end of the encoder 10 and is therefore in the most temporally advanced position. The optical pulses denoted by b, c, and d are each Bragg reflected light from the FBG 10b, FBG 10c, and FBG 10d respectively. Further, the FBG 10b, FBG 10c, and FBG 10d stand in a line in a row from the input end of the encoder 10 and, therefore, the optical pulses denoted by b, c, and d stand in a line in the order b, c, d after the optical pulse denoted by a as shown by FIG. 1B.

In the subsequent description, the optical pulses corresponding with the Bragg reflected light a, Bragg reflected light b, Bragg reflected light c, and Bragg reflected light d respectively are also represented as the optical pulse a, optical pulse b, optical pulse c, and optical pulse d. Further, the optical pulse a, optical pulse b, optical pulse c, and optical pulse d are also called chip pulses.

The relationship between the phases of the Bragg reflected light a, b, c, and d that constitute the encoded optical pulse train is as follows as mentioned earlier. The phase of the Bragg reflected light a and the phase of the Bragg reflected light b are equal. The difference between the phase of the Bragg reflected light b and the phase of the Bragg reflected light c is $\pi$. The difference between the phase of the Bragg reflected light c and the phase of the Bragg reflected light d is $\pi$. That is, when the phase of the Bragg reflected light a is taken as the reference, the phases of the Bragg reflected light a, Bragg reflected light b, and Bragg reflected light d are equal and the phase of the Bragg reflected light c differs by $\pi$ from the phases of the Bragg reflected light a, Bragg reflected light b, and Bragg reflected light d.

Therefore, in FIG. 1B, the optical pulses corresponding with the Bragg reflected light a, the Bragg reflected light b and Bragg reflected light d are denoted by solid lines and the optical pulse corresponding with the Bragg reflected light c is denoted by a dotted line. That is, in order to distinguish the relationship between the phases of the respective Bragg reflected light, solid lines and dotted lines are used to represent the corresponding optical pulses. The phases of the optical pulses denoted by a solid line are in a mutually equal relationship and the phases of optical pulses denoted by dotted lines are in a mutually equal relationship. Further, the phases of the optical pulses denoted by a solid line and the phases of the optical pulses denoted by a dotted line differ by $\pi$ from one another.

An encoded optical pulse train is input to the decoder 20 via the optical circulator 22 after passing through the optical fiber 18. Although the decoder 20 has the same structure as the encoder 10, the input end and output end are reversed. That is, the unit FBGs 20a, 20b, 20c, and 20d stand in a line in order starting from the input end of the decoder 20 but the unit FBG 20a and unit FBG 10d correspond. Further, a unit FBG 20b, unit FBG 20c and unit FBG 20d likewise correspond with the unit FBG 10c, unit FBG 10b, and unit FBG 10a respectively.

In the encoded optical pulse train that is input to the decoder 20, the optical pulse a constituting the encoded optical pulse train is first Bragg-reflected by the unit FBGs 20a, 20b, 20c, and 20d. This aspect will be described with reference to FIG. 1C. In FIG. 1C, the horizontal axis is the time axis. Further, the relationship before and after a time is illustrated by expediently assigning 1 to 7, where smaller numerical values denote increasingly early times.

FIG. 1C shows an encoded optical pulse train with respect to the time axis in the same way as FIG. 1B. When the encoded optical pulse train is input to the decoder 20, the encoded optical pulse train is first Bragg-reflected by unit FBG20a. The reflected light that is Bragg-reflected by unit FBG20a is shown as 'Bragg reflected light a'. Likewise, the reflected light that is Bragg-reflected by the unit FBG 20b, unit FBG 20c, and unit FBG 20d is shown as the Bragg reflected light b', c', and d'.

The optical pulses a, b, c and d constituting the encoded optical pulse train are Bragg-reflected by unit FBG 20a and stand in a line on the time axis of the string denoted by a' in FIG. 1C. The optical pulse a that is Bragg-reflected by unit FBG 20a is an optical pulse that has a peak in a certain position that is denoted by 1 on the time axis. The optical pulse b that is Bragg-reflected by unit FBG 20b is an optical pulse with a peak in a certain position that is denoted by 2 on the time axis. Likewise, the optical pulse c and optical pulse d are optical pulses with a peak in a certain position denoted by 3 and 4 respectively on the time axis.

The optical pulses a, b, c, and d that constitute the encoded optical pulse train are also Bragg-reflected by unit FBG 20b and stand in a line on the time axis of the string denoted by b' in FIG. 1C. The Bragg-reflected reflected light b' that is reflected by unit FBG 20b has a phase that is shifted by $\pi$ in comparison with the phases of the Bragg-reflected light a', c' and d'. Therefore, the string of optical pulses that stand in a line on the time axis of the string denoted by a' and the string of optical pulses that stand in a line on the time axis of the string denoted by b' have phases that are all shifted by $\pi$.

As a result, whereas a string of optical pulses that stand in a line in the order 1 to 4 on the time axis denoted by a' stand in a line in the order of a solid line, solid line, dotted line, and solid line, and a string of optical pulses that stand in a line in the order 2 to 5 on the time axis denoted by b' stand in a line in the order of a dotted line, dotted line, solid line, and dotted line. The displacement on the time axis of the optical pulse train denoted by a' and the optical pulse train denoted by b' is because, among the optical pulses constituting the encoded optical pulse train, the optical pulse a is input to the decoder 20 before the optical pulse b.

Likewise, the optical pulses a, b, c, and d that constitute the encoded optical pulse train are also Bragg-reflected by the unit FBG 20c and unit FBG 20d and the optical pulses stand in a line on the time axis of the strings denoted by c' and d' respectively in FIG. 1C. The Bragg-reflected light c' and d' reflected by the unit FBG 20c and unit FBG 20d have phases that are equal in comparison with the Bragg-reflected light a'. Therefore, in FIG. 1C, the optical pulse train denoted by c' and the optical pulse train denoted by d' stand in a line on the time axis. The optical pulses related to the Bragg-reflected light a', c', and d' are shifted in parallel on the time axis but the mutual phase relationship between the optical pulses related to the Bragg-reflected light is the same.

FIG. 1D shows the cross-correlation waveform of the input optical pulses that are decoded by the decoder 20. The horizontal axis is the time axis and corresponds to the illustration shown in FIG. 1C. The cross-correlation waveform is obtained by the sum of the Bragg-reflected light a', b', c', and d' from the respective unit FBGs of the decoder and, therefore, all the Bragg-reflected light a', b', c' and d' shown in FIG. 1C is brought together. Because the optical pulses related to the Bragg-reflected light a', b', c' and d' are all added together with the same phase at the time shown as 4 on the time axis of FIG. 1C, a maximum peak is formed. Further, because two optical pulses denoted by a dotted line and one optical pulse denoted by a solid line are added together at the times shown as 3 and 5 on the time axis of FIG. 1C, one optical pulse's worth of peaks whose phases differ by $\pi$ are formed for the maximum peak at the time shown as 4. Further, because two optical pulses denoted by a solid line and one optical pulse denoted by a dotted line are added together at the times shown as 1 and 7 on the time axis of FIG. 1C, one optical pulse's worth of peaks whose phases are equal are formed for the maximum peak at the time shown as 4.

As described hereinabove, the optical pulses are encoded by the encoder 10 to produce an encoded optical pulse train and the encoded optical pulse train is decoded by the decoder 20 to generate a cross-correlation waveform. In the example taken here, an optical code (0,0,1,0) of four bits (codelength 4) is used but the description above is equally valid even in cases where optical code is not used.

The operating principles of a case where the optical pulse time spreader that uses an SSFBG is used as an encoder and decoder were described hereinabove. Here, although a case where the codelength was 4 was taken for the sake of expediency in the description, code with a longer codelength may be used in the actual optical code division multiplexing communication.

In optical code division multiplexing communications, multiplexing is performed by allocating different code to each of the channels. Although distinct codes in a number equal to at least the number of channels are required in order to increase the multiplexed channels, the codelength must be increased in order to increase the number of distinct codes. That is, because one channel is allocated to one code, distinct codes in at least the same number as the number of channels are required.

For example, when an M serial code of codelength 15 is used, two codes are used as the distinct codes. That is, in this case, two-channel optical code division multiplexing communication can be implemented. However, a code of a longer wavelength must be used when there is the desire to implement optical code division multiplexing communication with a greater number of channels. For example, if the codelength is increased to 31, codes of 33 types can be prepared by combining the codes of an M sequence and a Gold sequence. That is, in this case, optical code division multiplexing communication of 33 channels can be implemented.

In order to increase the codelength, either the bit rate of the optical signal must be raised or the spreading time interval must be increased. This fact will be described by using an example in which a case where code of codelength 15 and a case where code of codelength 31 are adopted are compared. The bit rate of the optical signal is related to the subsequently described data rate and chip rate.

When the codelength is 15, if the transmission rate for one channel (also referred to as the 'data rate' hereinafter) is 1.25 Gbit/s, the bit rate per chip pulse (also referred to as the 'chip rate' hereinafter) is 18.75 Gbit/s (=1.25 Gbit/s×15). That is, the spreading time interval is the reciprocal of the data rate, that is, $5.33 \times 10^{-7}$ s ($\approx(1/18.75) \times 10^{-9}$ s).

On the other hand, when code of codelength 31 is adopted, the chip rate must be made 38.75 Gbit/s (=1.25 Gbit/s×31) in order to equalize the data rate at 1.25 Gbit/s. Further, in order to make the chip rate 18.75 Gbit/s as per the case where code of codelength 15 is used, the data rate must be made 0.605 Gbit/s ($\approx(1.25$ Gbit/s×(15/31). That is, the spreading time interval must be the reciprocal of the data rate, that is, $1.65 \times 10^{-9}$ s ($\approx(1/0.605) \times 10^{-9}$ s).

The method of dealing with a case where the codelength is long may be either that of raising the chip rate with the data rate remaining equal, or lowering the data rate with the chip rate remaining equal, that is, increasing the spreading time interval. In order to raise the chip rate, the transmitter and receiver must be afforded a high speed operation. As a result, the device must be improved and a conversion of the required parts and so forth is required. Such device improvement cannot be implemented easily. Further, the data rate corresponding with code of a long code length must be lowered with the chip rate remaining equal, that is, the spreading time interval must be increased. As a result, the transmission capacity is reduced.

SUMMARY OF THE INVENTION

Therefore, an object of the present invention is to provide an optical pulse time spreading device capable of encoding that makes it possible to allocate, with channel discrimination, a plurality of channels by means of the same code. A further object of the present invention is to provide an optical code division multiplexing transmission method that uses the optical pulse time spreading device as an encoder and a decoder as well as a device for implementing this method. Accordingly, an optical code division multiplexing transmission method as well as a device for implementing this method are provided, whereby, even when the number of channels increases, it is not necessary to deal with this increase by increasing the codelength.

The optical pulse time spreading device of the present invention is an optical pulse time spreading device that is capable of generating an encoded optical pulse signal that can be discriminated even by means of the same code by selecting a plurality of distinct values as the phase difference between adjacent chip pulses. This constitution is as follows.

That is, the optical pulse time spreading device of the present invention comprises S (where S is a natural number of 2 or more) optical pulses time spreaders. Further, these S optical pulse time spreaders, i.e. the first, second, . . . Sth optical pulse time spreaders output optical pulses that are input thereto as a series of chip pulses stream that are sequentially arranged after being subjected to time spreading on the time axis in accordance with optical phase codes.

Each of the S optical pulse time spreaders (first, second, . . . , Sth optical pulse time spreaders) comprises phase control means that provides a phase difference between each of the adjacent chip pulses. In cases where adjacent code values are equal, the phase control means provided in the ith optical pulse time spreader (i=1, 2, . . . , S) obtains the phase difference between adjacent chip pulses corresponding with the code values by means of $$2\pi M + a_i \pi \quad (1)$$

When adjacent code values are different, the phase difference between adjacent chip pulses corresponding with the code values is obtained by means of:

$$2\pi M + (2N+1)\pi + a_i \pi \quad (2)$$

However, M and N are integers. Further, $a_i$ is an identification parameter. There are S optional distinct real numbers that satisfy $0 \leq a_i < 2$.

Furthermore, the phase control means can also be constituted such that unit diffraction gratings corresponding one-on-one with the code values constituting the optical phase codes arranged in a row are arranged in series in the direction of the optical waveguide. In this case, the phase difference of Bragg-reflected light from two unit diffraction gratings that are adjacent and provide equal code values is provided by the above-mentioned equation (1) and the phase difference of Bragg-reflected light from two unit diffraction gratings that are adjacent and provide different code values are established as provided by Equation (2) above.

Further, the abovementioned optical waveguide is preferably an optical fiber.

Furthermore, the optical code division multiplexing transmission method of the present invention comprises an encoding step and a decoding step and is characterized in that these steps are executed by using the abovementioned optical pulse time spreading device. Here, the encoding step is a step of generating an optical pulse signal as an encoded optical pulse signal by performing encoding by using an optical phase code. Further, the decoding step is a step that generates a cross-correlation waveform of the optical pulse signal by using the same code as the optical phase code to decode the encoded optical pulse signal.

The optical code division multiplexing transmission device for implementing the above optical code division multiplexing transmission method is constituted comprising an encoding device and a decoding device. Further, the optical code division multiplexing transmission device is characterized in that the abovementioned optical pulse time spreading device is used as an encoding device and decoding device. That is, the encoding step and decoding step are implemented by means of the optical pulse time spreading device.

The phase difference between chip pulses corresponding with code values of the ith optical pulse time spreader that constitutes the optical pulse time spreading device of the present invention is obtained by means of Equations (1) and (2) above. Therefore, if the value of the identification parameter $a_i$ is estimated by selecting the integers M and N, Equations (1) and (2) above are estimated. For example, supposing that M=N=0 and $a_i$=0 Equation (1) yields 0 and Equation (2) yields $\pi$. Therefore, supposing that the phase difference in cases where adjacent code values are equal is set at 0 and the phase difference when adjacent code values are different is set at $\pi$ in accordance with the codes, the optical pulse input to the optical pulse time spreaders outputs a series of chip pulses stream corresponding with the codes provided.

Further, likewise in the case of the jth optical pulse time spreader (j=1, 2, ... S, where j≠i), supposing that M=N=0 and $a_j$=0.2, Equation (1) yields 0.2π and Equation (2) yields 1.2π (=π+0.2π). Therefore, if the phase difference in a case where adjacent code values are equal is 0.2π and the phase difference in a case where the adjacent code values are different is 1.2π in accordance with the same codes as the codes above, the optical pulse that is input to the jth optical pulse time spreader also outputs a series of chip pulses stream that correspond with the same codes as the codes above as per the ith optical pulse time spreader above.

However, in the case of the series of chip pulses stream that are output by the ith optical pulse time spreader with the settings M=N=0 and $a_i$=0 and the series of chip pulses stream that are output by the jth optical pulse time spreader with the settings M=N=0 and $a_j$=0.2, the reflected codes are the same but the values of $a_i$ and $a_j$ are different. Hence, the phase differences between the chip pulses are different and both series of chip pulses stream can be identified. That is, whereas the phase difference between chip pulses is 0 or π in the case of the series of chip pulses stream that are output by the ith optical pulse time spreader with the settings M=N=0 and $a_i$=0, the phase difference between chip pulses in the case of the series of chip pulses stream that are output by the jth optical pulse time spreader with the settings M=N=0 and $a_j$=0.2 is 0.2π or 1.2π.

Therefore, the strings of chip pulses that are output by each of the optical pulse time spreaders set with different values $a_i$ and $a_j$ can both be identified because the phase difference between chip pulses is different even when the codes are the same. That is, the optical pulse signal encoded by the ith optical pulse time spreader with the settings M=N=0 and $a_i$=0 is decoded by the ith optical pulse time spreader with the settings M=N=0 and $a_i$=0 but is not decoded by the jth optical pulse time spreader with the settings M=N=0 and $a_j$=0.2.

Thus, the optical pulse time spreading device of the present invention performs encoding that is capable of allocating, with channel discrimination, a plurality of channels even by using the same codes. That is, by allocating S optional distinct real numbers that satisfy 0≦ai<2 (i=1, 2, ..., S), S different identifiable encodings can be performed even with the same codes and S channels' worth of allocation is possible.

The optical pulse time spreading device of the present invention, which is constituted by combining S optical pulse time spreaders each formed by allocating S distinct real numbers as $a_i$ values, is capable of implementing an optical code division multiplexing transmission device that performs S channels' worth of allocation for one code. Whereas, conventionally, only one channel has been allocated for one code, S times the number of channels are allocated for the same number of codes by using the optical pulse time spreading device of the present invention.

Accordingly, there is no need to deal with the increase in the number of channels by increasing the codelength. That is, because there is no need to increase the codelength, there is also no need to change the data rate or change the chip rate.

Moreover, if the phase control means has a constitution produced by arranging unit diffraction gratings in series in the direction of the optical waveguide as mentioned earlier, there is the advantage that the phase control means can be formed more simply than using a transversal-type optical filter.

Furthermore, supposing that this optical waveguide is an optical fiber, a unit FBG can then be used as a unit diffraction grating and an optical pulse time spreader can be formed more easily. Further, because an optical communication system is used with optical fiber serving as the optical transmission channel, it is often suitable to use an optical pulse time spreader constituted using optical fiber as the phase control means.

According to the optical code division multiplexing transmission method of the present invention and the optical code division multiplexing transmission device of the present invention, the encoding device used in the encoding step and the decoding device used in the decoding step are formed by the optical pulse time spreading device of the present invention. Hence, it is possible to implement an optical code division multiplexing transmission device that performs S channels' worth of allocation for one code. Accordingly, it is possible to provide an optical code division multiplexing transmission method and a device for implementing this method that do not necessitate a change to the data rate or a change to the chip rate even when the number of channels increases.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1A:
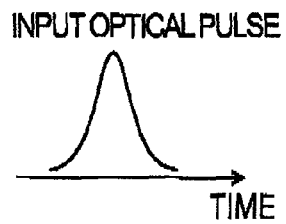
FIGS. 1A-1E serve to illustrate the operating principles of an encoder and decoder that use an SSFBG.
Figure 1B:
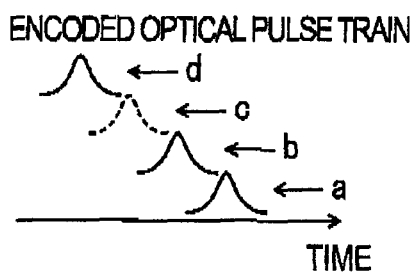
Figure 1C:
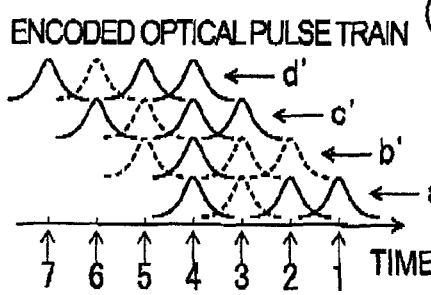
Figure 1D:
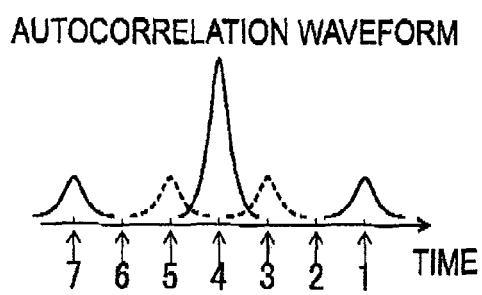
Figure 1E:
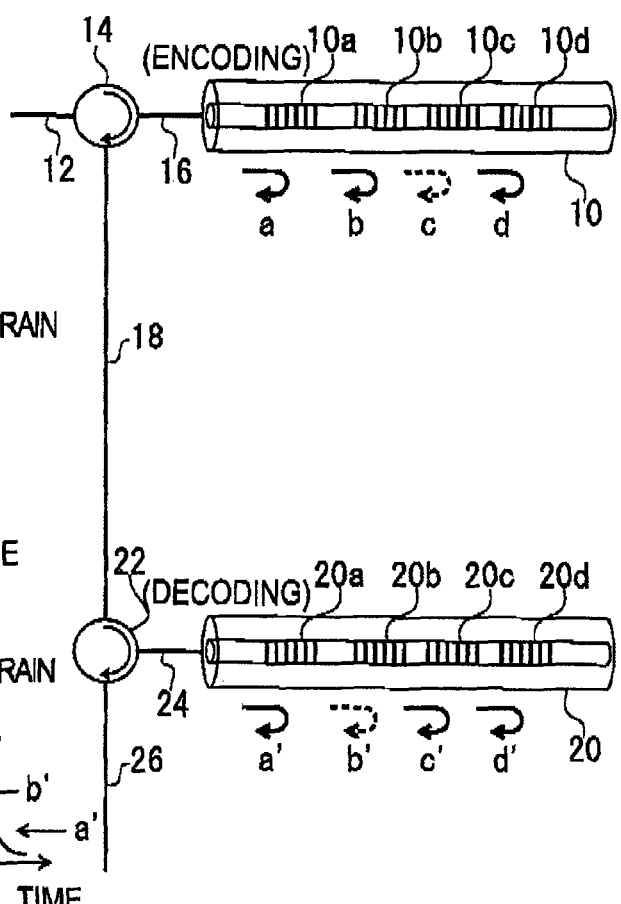

Embodiments of the present invention will be described hereinbelow with reference to the drawings. Further, each of the drawings merely shows a constitutional example of the present invention and schematically shows the respective constituent elements and dispositional relationship and so forth to an extent permitting an understanding of the present invention. The present invention is not limited to or by the illustrated examples. Further, although specified conditions and so forth are sometimes used in the following description, these conditions and so forth are merely an example of a suitable example. The present invention is not limited to the conditions and so forth in anyway. Moreover, the same numbers are shown assigned to the same constituent elements in each of the drawings and repetitive description is also omitted.

Optical Pulse Time Spreading Device

First, the relationship between the optical phase codes set for the respective optical pulse time spreaders constituting the optical pulse time spreading device and the phase difference between adjacent chip pulses that is established in order to estimate the code values of the optical phase code will be described with reference to Tables 1 and 2. Here, for the sake of expediency of the description, S=5, that is, an optical pulse time spreading device that is constituted comprising five optical pulse time spreaders, which are first to fifth optical pulse time spreaders, is adopted as an example. However, it is clear that the following description is equally valid even when S is any value of 2 or more.

In Tables 1 and 2, the adopted optical phase code is (0,0,0,1,1,1,1,0,1,0,1,1,0,0,1) when represented as a 15-bit code string. That is, the description will be provided by taking an optical phase code of codelength 15. Further, suppose that M=N=0, the identification parameters are $a_1=0$, $a_2=0.2$, $a_3=0.4$, $a_4=0.6$, and $a_5=0.8$. Therefore, the identification parameters $a_1$, $a_2$, $a_3$, $a_4$, and $a_5$ satisfy $0 \leq a_i < 2$ (i=1,2,3,4,5).

Naturally, the following description is similarly valid for cases where other optical phase codes are set, other values are set for M and N, and other identification parameters are established.

Here, as mentioned earlier, the identification parameters $a_1$, $a_2$, $a_3$, $a_4$, and $a_5$ are established at equal intervals spaced apart at an interval of 0.2. When the optical pulse time spreading device of the present invention is used as an OCDM encoding device and decoding device, the identification parameters are normally established spaced apart at equal intervals.

This is because, as will be described subsequently, as the interval of the identification parameters narrows, the difference between the peak intensity of the cross-correlation waveform obtained following decoding and the peak intensity of the cross-correlation waveform grows smaller, whereby identification of the peaks readily produces errors and the signal reception error rate increases.

The minimum value of the difference between the identification parameters when the identification parameters are established spaced apart at equal intervals is sometimes called the identification parameter interval and denoted by a. In the abovementioned example, the minimum value of the difference between the identification parameters is $a_2-a=a_3-a_2=a_4-a_3=a_5-a_4=0.2$ and, therefore, the interval $\Delta a$ of the identification parameters is 0.2.

In the case of the series of chip pulses stream output by the first optical pulse time spreader, the phase difference between the adjacent chip pulses corresponding with the same code values (that is, the phase difference given by Equation (1)) is 0 and the phase difference between the adjacent chip pulses corresponding with different code values (that is, the phase difference given by Equation (2)) is $\pi$. Subsequently, the phase difference given by Equation (1) is also referred to as 'phase difference $\phi A$'. Further, the phase difference given by Equation (2) is also referred to as 'phase difference $\phi B$'. That is, the phase relationship between the chip pulses constituting the series of chip pulses stream output by the first optical pulse time spreader is such that the phase difference $\phi A=2\pi M+a_1\pi=0+0=0$ and the phase difference $\phi B=2\pi M+(2N+1)\pi+a_1\pi=0+\pi+0=\pi$.

Likewise, the phase relationship between the chip pulses constituting the series of chip pulses stream output by the second optical pulse time spreader is such that the phase difference $\phi A=2\pi M+a_2\pi=0+0.2\pi=0.2\pi$ and the phase difference $\phi B=2\pi M+(2N+1)\pi+a_2\pi=0+\pi+0.2\pi=1.2\pi$. The phase relationship between the chip pulses constituting the series of chip pulses stream output by the third optical pulse time spreader is such that the phase difference $\phi A=2\pi M+a_3\pi=0+0.4\pi=0.4\pi$ and the phase difference $\phi B=2\pi M+(2N+1)\pi+a_3\pi=0+\pi+0.4\pi=1.4\pi$. The phase relationship between the chip pulses constituting the series of chip pulses stream output by the fourth optical pulse time spreader is such that the phase difference $\phi A=2\pi M+a_4\pi=0+0.6\pi=0.6\pi$ and the phase difference $\phi B=2\pi M+(2N+1)\pi+a_4\pi=0+\pi+0.6\pi=1.6\pi$. The phase relationship between the chip pulses constituting the series of chip pulses stream output by the fifth optical pulse time spreader is such that the phase difference $\phi A=2\pi M+a_5\pi=0+0.8\pi=0.8\pi$ and the phase difference $\phi B=2\pi M+(2N+1)\pi+a_5\pi=0+\pi+0.8\pi=1.8\pi$.

The integer M that appears in Equations (1) and (2) that provides the phase difference between adjacent chip pulses fulfils the role of generally expressing values in a physically equivalent relationship as the phase difference. That is, $a_i\pi$ (M=0), $2\pi+a_i\pi$ (M=1), $4\pi+a_i\pi$ (M=2), ..., $(2N+1)\pi+a_i\pi$ (M=0), $2\pi+(2N+1)\pi+a_i\pi$ (M=1), $4\pi+(2N+1)\pi+a_i\pi$ (M=2), ... and so forth are all physically equivalent as phase differences. A physically equivalent relationship as it is called here corresponds to the fact that when the phase difference $2\pi$ is converted to a wavelength, a value that is exactly equal to the wavelength is produced and the light wave constituting the chip pulse returns to the same phase with each advancing single wavelength (cycle).

Furthermore, the integer N that appears in Equation (2) that provides the phase difference between adjacent chip pulses fulfils the role of requesting that the relationship between the phase difference $\phi A$ and phase difference $\phi B$ should be established as $\phi A-\phi B=(2N+1)\pi$. That is, if $\phi A-\phi B$ is set as an odd number multiple of $\pi$, this signifies that the relationship between the phase difference $\phi A$ and phase difference $\phi B$ is physically equivalent. A physically equivalent relationship as it is called here corresponds to the fact that when the phase difference $\pi$ is converted to a wavelength, a value that is exactly equal to a ½ wavelength is produced and the $\phi A-\phi B$ is in an antiphase relationship each time the light wave constituting the chip pulse equals the optical path length difference corresponding to the length of the odd number multiple of the ½ wavelength (½ cycle).

TABLE 1

| | | | | | | | CHIP NUMBER | | | | | | | |
|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 |
| | | | | | | | CODE | | | | | | | |
| 0 | 0 | 0 | 1 | 1 | 1 | 1 | 0 | 1 | 0 | 1 | 1 | 0 | 0 | 1 |
| [1]$a_1=0$    0 | 0 | 0 | $\pi$ | 0 | 0 | 0 | $\pi$ | $\pi$ | $\pi$ | $\pi$ | 0 | $\pi$ | 0 | $\pi$ |
| [2]$a_2=0.2$  $0.2\pi$ | $0.2\pi$ | $0.2\pi$ | $1.2\pi$ | $0.2\pi$ | $0.2\pi$ | $0.2\pi$ | $1.2\pi$ | $1.2\pi$ | $1.2\pi$ | $1.2\pi$ | $0.2\pi$ | $1.2\pi$ | $0.2\pi$ | $1.2\pi$ |
| [3]$a_3=0.4$  $0.4\pi$ | $0.4\pi$ | $0.4\pi$ | $1.4\pi$ | $0.4\pi$ | $0.4\pi$ | $0.4\pi$ | $1.4\pi$ | $1.4\pi$ | $1.4\pi$ | $1.4\pi$ | $0.4\pi$ | $1.4\pi$ | $0.4\pi$ | $1.4\pi$ |
| [4]$a_4=0.6$  $0.6\pi$ | $0.6\pi$ | $0.6\pi$ | $1.6\pi$ | $0.6\pi$ | $0.6\pi$ | $0.6\pi$ | $1.6\pi$ | $1.6\pi$ | $1.6\pi$ | $1.6\pi$ | $0.6\pi$ | $1.6\pi$ | $0.6\pi$ | $1.6\pi$ |
| [5]$a_5=0.8$  $0.8\pi$ | $0.8\pi$ | $0.8\pi$ | $1.8\pi$ | $0.8\pi$ | $0.8\pi$ | $0.8\pi$ | $1.8\pi$ | $1.8\pi$ | $1.8\pi$ | $1.8\pi$ | $0.8\pi$ | $1.8\pi$ | $0.8\pi$ | $1.8\pi$ |

The abovementioned content is brought together in Tables 1 and 2. First, Table 1 will be described. Table 1 lists the relationship of the phase differences between the chip pulses constituting the series of chip pulses stream that are output by the optical pulse time spreading device. The respective rows [1], [2], [3], [4], and [5] illustrate the relationship of the phase differences between the chip pulses that are output by each of the first, second, third, fourth, and fifth optical pulse time spreaders.

Numbers 1 to 15 have been assigned to the first row of Table 1 as chip numbers. This illustrates the first to fifteenth chip positions. The respective code values constituting the code written as (0,0,0,1,1,1,1,0,1,0,1,1,0,0,1) are illustrated in the corresponding chip fields as a 15-bit code string, which is set for all of the first to fifth optical pulse time spreaders in the second row of Table 1. That is, the code value 0 corresponding with the chip is entered in the field of chip number 1, which is the leading chip. Likewise, the code values 0, 0, 1, 1, and so forth corresponding with chip numbers 2, 3, 4, 5, and so forth are entered in the corresponding fields.

The phase relationship between the chip pulses constituting the series of chip pulses stream that are output by the first optical pulse time spreader is established as the phase difference $\phi A=0$ and the phase difference $\phi B=\pi$. Further, because the code value of chip number 1 is 0 and the code value of chip number 2 is 0, the phase difference between the chip pulse corresponding with chip number 1 and the chip pulse corresponding with chip number 2 is $\phi A$. Further, because the values are 0, the value appearing in the field between the field of chip number 1 and the field of chip number 2 of the row shown as '1' in Table 1 is 0. Likewise, because the code value of chip number 2 is 0 and the code value of chip number 3 is also 0 and equal, the value appearing in the field between the chip number 2 and the field of chip number 3 of the row shown as '1' is also 0.

However, because the code value of chip number 3 is 0 and the code value of the chip number 4 is 1 and therefore different, the phase difference between the chip pulse corresponding with chip number 3 and the chip pulse corresponding with chip number 4 is $\phi B$. Further, because this value is $\pi$, the value appearing in the field between the field of chip number 3 and the field of chip number 4 of the row shown as '1' in Table 1 is $\pi$. So too in the other fields, likewise when adjacent code values are equal, 0 is entered in the field between the chip numbers corresponding with the code values and, when adjacent code values are different, $\pi$ is entered in the field between the chip numbers corresponding with the code values.

The row shown as '2' in Table 1 that illustrates the phase relationship between the chip pulses constituting the series of chip pulses stream output by the second optical pulse time spreader will be described next. The phase relationship between the chip pulses constituting the series of chip pulses stream output by the second optical pulse time spreader is established such that the phase difference $\phi A=0.2\pi$ and the phase difference $\phi B=1.2\pi$.

Therefore, because the code value of the chip number 1 and the code value of chip number 2 are 0 and equal, the phase difference between the chip pulse corresponding with chip number 1 and the chip pulse corresponding with chip number 2 is $\phi A$. Further, because the value is 0.2$\pi$, the value appearing in the field between the field of chip number 1 and the field of chip number 2 of the row shown as '2' in Table 1 is 0.2$\pi$. Likewise, because the code value of chip number 2 and the code value of chip number 3 are both 0 and equal, the value appearing in the field between the field of chip number 2 and the field of chip number 3 of the row shown as '2' is also 0.2$\pi$.

On the other hand, because the code value of chip number 3 is 0 and the code value of chip number 4 is 1 and different, the phase difference between the chip pulse corresponding with chip number 3 and the chip pulse corresponding with chip number 4 is $\phi B$. Further, because this value is 1.2$\pi$, the value appearing in the field between the field of chip number 3 and the field of chip number 4 of the row shown as '2' in Table 1 is 1.2$\pi$. So too in the other fields, likewise when adjacent code values are equal, 0.2$\pi$ is entered in the field between the chip numbers corresponding with the code values and, when adjacent code values are different, 1.2$\pi$ is entered in the field between the chip numbers corresponding with the code values.

The phase relationship between the chip pulses constituting a series of chip pulses stream that are output by the third, fourth, and fifth pulse time spreaders is also illustrated in the rows shown as '3', '4', and '5' of Table 1 as above.

TABLE 2

| | CHIP NUMBER | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| | | | | | | | | CODE | | | | | | | |
| | 0 | 0 | 0 | 1 | 1 | 1 | 1 | 0 | 1 | 0 | 1 | 1 | 0 | 0 | 1 |
| [1]$a_1$ = 0 | 0 | 0 | 0 | $\pi$ | $\pi$ | $\pi$ | $\pi$ | 0 | $\pi$ | 0 | $\pi$ | $\pi$ | 0 | 0 | $\pi$ |
| [2]$a_2$ = 0.2 | 0 | 0.2$\pi$ | 0.4$\pi$ | 1.6$\pi$ | 1.8$\pi$ | 0 | 0.2$\pi$ | 1.4$\pi$ | 0.6$\pi$ | 1.8$\pi$ | $\pi$ | 1.2$\pi$ | 0.4$\pi$ | 0.6$\pi$ | 1.8$\pi$ |
| [3]$a_3$ = 0.4 | 0 | 0.4$\pi$ | 0.8$\pi$ | 0.2$\pi$ | 0.6$\pi$ | $\pi$ | 1.4$\pi$ | 0.8$\pi$ | 0.2$\pi$ | 1.6$\pi$ | $\pi$ | 1.4$\pi$ | 0.8$\pi$ | 1.2$\pi$ | 0.6$\pi$ |
| [4]$a_4$ = 0.6 | 0 | 0.6$\pi$ | 1.2$\pi$ | 0.8$\pi$ | 1.4$\pi$ | 0 | 0.6$\pi$ | 0.2$\pi$ | 1.8$\pi$ | 1.4$\pi$ | $\pi$ | 1.6$\pi$ | 1.2$\pi$ | 1.8$\pi$ | 1.4$\pi$ |
| [5]$a_5$ = 0.8 | 0 | 0.8$\pi$ | 1.6$\pi$ | 1.4$\pi$ | 0.2$\pi$ | $\pi$ | 1.8$\pi$ | 1.6$\pi$ | 1.4$\pi$ | 1.2$\pi$ | $\pi$ | 1.8$\pi$ | 1.6$\pi$ | 0.4$\pi$ | 0.2$\pi$ |

Table 2 is a table that lists the phases of the chip pulses constituting the chip pulse string that is output by the optical pulse time spreading device by taking the phase of the chip pulse corresponding with chip number 1 as the reference. The respective rows shown as '1', '2', '3', '4', and '5' show the phase values of the chip pulses corresponding with chip number 2 and subsequent chip numbers, for which the phase of the chip pulse corresponding with chip number 1 serves as a reference, of the chip pulses output by each of the first, second, third, fourth, and fifth optical pulse time spreaders as per Table 1. Therefore, the phases of the chip pulses corresponding with chip number 1 are all 0.

As per Table 1, the first to fifteenth chip positions are illustrated with the numbers 1 to 15 assigned as the chip numbers to the first row. Codes which are set for all of the first to fifth optical pulse time spreaders are illustrated as per Table 1 also in the second row.

The row shown as '1' in Table 1, which is shown with the phase of the chip pulse corresponding with chip number 1 as the reference, of the chip pulses constituting the series of chip pulses stream output by the first optical pulse time spreader, will now be described.

The phase of the chip pulse corresponding with chip number 1 is 0 as mentioned earlier. Because the phase difference between the chip pulse corresponding with chip number 1 and the chip pulse corresponding with chip number 2 is $\phi A=0$, the phase of the chip pulse corresponding with chip number 2 is 0 (=0+0). Because the phase difference between the chip pulse corresponding with chip number 1 and the chip pulse corresponding with chip number 2 is 0 and the phase difference between the chip pulse corresponding with chip number 2 and the chip pulse corresponding with chip number 3 is also 0, the phase of the chip pulse corresponding with chip number 3 is 0 (=0+0+0).

Furthermore, because the phase difference between the chip pulse corresponding with chip number 1 and the chip pulse corresponding with chip number 2 is 0, the phase difference between the chip pulse corresponding with chip number 2 and the chip pulse corresponding with chip number 3 is 0, and the phase difference between the chip pulse corresponding with chip number 3 and the chip pulse corresponding with chip number 4 is $\pi$, the phase of the chip pulse corresponding with chip number 4 is $\pi$ (=0+0+0+$\pi$).

Likewise, the phase of the chip pulses corresponding with chip numbers 5, 6, and 7 is equal to the phase of chip number 4 and is therefore $\pi$. However, in consideration of the above, the phase of the chip pulse corresponding with chip number 8 is 0+0+0+$\pi$+0+0+0+$\pi$=2$\pi$ when phases are added from the phase of the chip pulse corresponding with chip number 1 to the phase of the chip pulse corresponding with chip number 8. That is, the phase of the chip pulse corresponding with chip number 8 is 2$\pi$. However, because the fact that the phase is 0 and the phase is 2$\pi$ signifies that the chip pulses are physically in-phase, 0 appears in the field of chip number 8. The phase values appearing in the fields of chip number 9 and subsequent chip numbers are also recorded in accordance with the same rules.

The row shown as '2' in Table 2 that is shown with the phase of the chip pulse corresponding with chip number 1 serving as a reference of the chip pulse constituting a series of chip pulses stream output by the second optical pulse time spreader will be described next.

The phase of the chip pulse corresponding with chip number 1 is 0 as mentioned above. Because the phase difference between the chip pulse corresponding with chip number 1 and the chip pulse corresponding with chip number 2 is $\phi A=0.2\pi$, the phase of the chip pulse corresponding with chip number 2 is 0.2$\pi$ (=0+0.2$\pi$). Because the phase difference between the chip pulse corresponding with chip number 1 and the chip pulse corresponding with chip number 2 is 0.2$\pi$ and the phase difference between the chip pulse corresponding with chip number 2 and the chip pulse corresponding with chip number 3 is also 0.2$\pi$, the phase of the chip pulse corresponding with chip number 3 is also 0.4$\pi$ (=0+0.2$\pi$+0.2$\pi$).

Furthermore, because the phase difference between the chip pulse corresponding with chip number 1 and the chip pulse corresponding with chip number 2 is 0.2$\pi$, the phase difference between the chip pulse corresponding with chip number 2 and the chip pulse corresponding with chip number 3 is also 0.2$\pi$, and the phase difference between the chip pulse corresponding with chip number 3 and the chip pulse corresponding with chip number 4 is 1.2$\pi$, the phase of the chip pulse corresponding with chip number 4 is 1.6$\pi$ (=0+0.2$\pi$+0.2$\pi$+1.2$\pi$).

Further, because the phase difference between the chip pulse corresponding with chip number 1 and the chip pulse corresponding with chip number 2 is 0.2$\pi$, the phase difference between the chip pulse corresponding with chip number 2 and the chip pulse corresponding with chip number 3 is also 0.2$\pi$, the phase difference between the chip pulse corresponding with chip number 3 and the chip pulse corresponding with chip number 4 is 1.2$\pi$, and the phase difference between the chip pulse corresponding with chip number 4 and the chip pulse corresponding with chip number 5 is 0.2$\pi$, the phase of the chip pulse corresponding with chip number 5 is then 1.8$\pi$ (=0+0.2$\pi$+0.2$\pi$+1.2$\pi$+0.2$\pi$).

Further, because the phase difference between the chip pulse corresponding with chip number 1 and the chip pulse corresponding with chip number 2 is 0.2$\pi$, the phase difference between the chip pulse corresponding with chip number 2 and the chip pulse corresponding with chip number 3 is also 0.2$\pi$, the phase difference between the chip pulse corresponding with chip number 3 and the chip pulse corresponding with chip number 4 is 1.2$\pi$, the phase difference between the chip pulse corresponding with chip number 4 and the chip pulse corresponding with chip number 5 is 0.2$\pi$, and the phase difference between the chip pulse corresponding with chip number 5 and the chip pulse corresponding with chip number 6 is 0.2$\pi$, the phase of the chip pulse corresponding with chip number 6 is then 2$\pi$ (=0+0.2$\pi$+0.2$\pi$+1.2$\pi$+0.2$\pi$+0.2$\pi$). However, as mentioned above, because the fact that the phase is 0 and the phase is 2$\pi$ signifies that the chip pulses are physically in-phase, 0 appears in the field of chip number 6.

Generally, if the phase difference with respect to the chip pulse corresponding with chip number 1 is a value A exceeding 2$\pi$, an integer k such that $0 \leq A-2k\pi \leq 2\pi$ is selected to produce a chip pulse such that the value of A−2k$\pi$ corresponds with the chip number. Here, because A=2$\pi$, A−2$\pi$=2$\pi$−2$\pi$=0 by selecting k=1, and 0 therefore appears in the field of chip number 6.

The phase values that appear in the fields of chip number 7 and subsequent chip numbers are also recorded in accordance with the same rules. Further, the rows shown as '3', '4', and '5' in Table 2 in which the phase of the chip pulse corresponding with chip number 1 is shown as the reference of the chip pulses constituting the series of chip pulses stream output by the third, fourth, and fifth optical pulse time spreaders are also recorded in accordance with the same rules.

Transversal-Type Optical Filter

A specific example of phase control means for setting codes for the optical pulse time spreaders constituting the optical pulse time spreading device will be described next.

First, an example in which phase control means are implemented by using a transversal-type optical filter will be described. The transversal-type optical filter is constituted as a PLC, as disclosed in Naoya Wada, et al., "A 10 Gb/s Optical Code Division Multiplexing Using 8-Chip Optical Bipolar Code and Coherent Detection", Journal of Lightwave Technology, Vol. 17, No. 10., October 1999 and Koichi Takiguchi, 'Development of planar light wave circuit into optical function device' Applied Physics Journal, Volume 72, 11, pages 1387 to 1392 (2003), for example.

As mentioned earlier, the transversal-type optical filter comprises a delay line, a variable coupling rate optical coupler, a phase modulation section, and a multiplexing section as principal constituent elements. The optical pulse that is input to the transversal-type optical filter provided with t variable coupling rate optical couplers is demultiplexed to produce (t+1) optical pulses by means of these t variable coupling rate optical couplers. Each of the demultiplexed (t+1) optical pulses has the phase thereof modulated in the phase modulation section in accordance with the corresponding code values and is output after a delay has been added by the delay line.

Figure 2A:
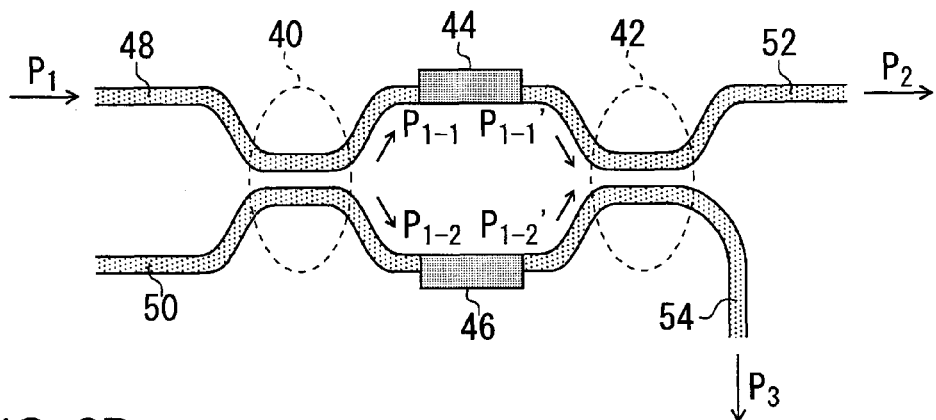
FIGS. 2A-2B show the schematic constitution of a transversal-type optical filter.

First, the outline and function of the constitution of the transversal-type optical filter will be described with reference to FIGS. 2A and 2B. FIG. 2A shows the schematic constitution of a variable coupling rate optical coupler and FIG. 2B shows the overall constitution of the transversal-type optical filter.

Figure 2B:
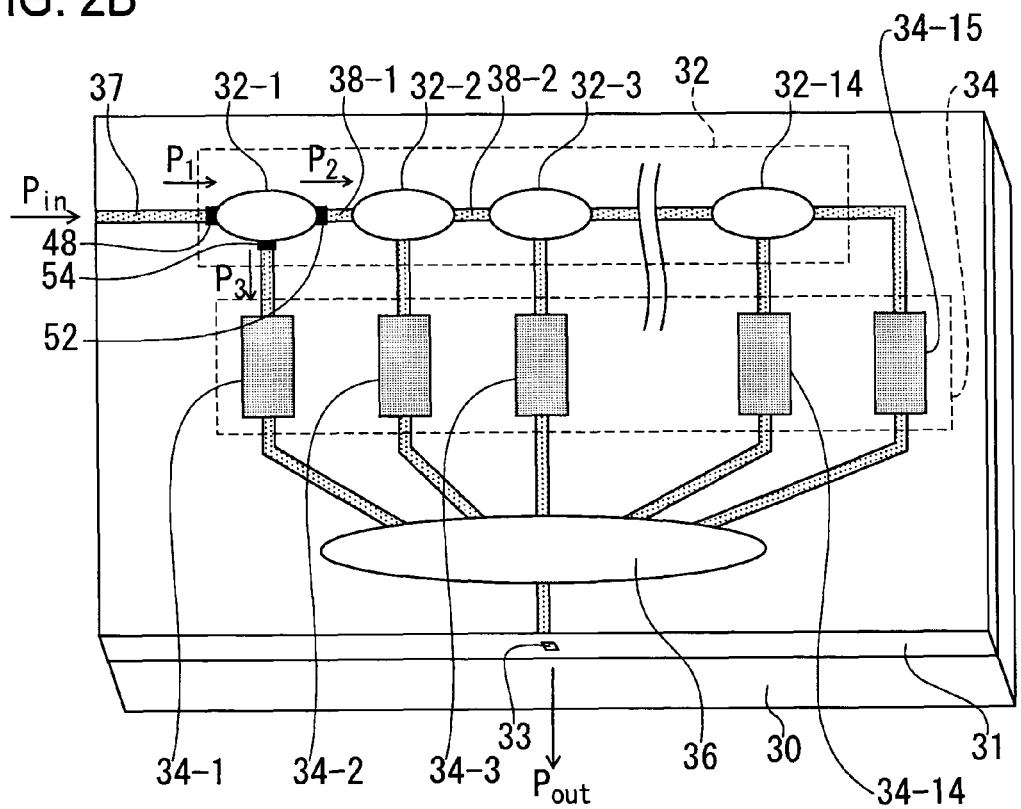

As shown in FIG. 2B, the transversal-type optical filter is formed having an optical waveguide formed as the basic constituent element by embedding a core 33, which is the part that guides light, in a cladding layer 31 on a silicon substrate 30. The cladding layer 31 is formed by using $SiO_2$, and Ge-doped $SiO_2$ is used as the constituent element of the core 33 in order to achieve a higher refractive index than the refractive index of the cladding layer 31.

As shown in FIG. 2B, the input optical pulse $P_{in}$ is input to a variable coupling rate optical coupler section 32 via an optical waveguide 37. The variable coupling rate optical coupler section 32 comprises a total of 14 variable coupling rate optical couplers which are the variable coupling rate optical couplers 32-1, 32-2, . . . , and 32-14 in order to make it possible to set a code of codelength 15.

An optical pulse that is input to a transversal-type optical filter comprising 14 variable coupling rate optical couplers is demultiplexed into 15 (=14+1) optical pulses. Each of the optical pulses that have been demultiplexed into 15 optical pulses has its phase modulated by a phase modulation section 34 in correspondence with the code values. The phase modulation section 34 comprises a total of 15 phase modulators which are the phase modulators 34-1, 34-2, . . . and 34-15 to which each of the 15 optical pulses output by the variable coupling rate optical coupler section 32 are input.

The phase modulation of the 15 optical pulses that is performed by the phase modulation section 34 is performed such that the phase relationship of the 15 optical pulses is the relationship shown in Tables 1 and 2. That is, the description is as follows assuming a case of a transversal-type optical filter that constitutes an ith optical pulse time spreader (i=1, 2, . . . 5), for example.

That is, each of the 15 phase modulators constituting the phase modulators 34 adds phases to the 15 optical pulses that have been demultiplexed by the variable coupling rate optical coupler section 32 so that the phase of the chip pulse corresponding to chip number 1 (the chip pulse output by the phase modulator 34-1, for example) is the reference and the phases of the 14 remaining optical pulses are shifted by the values appearing in the rows shown by 'i' in Table 2 (i=1, 2, . . . 5).

Furthermore, the optical waveguide 38-1 between the variable coupling rate optical coupler 32-1 and the variable coupling rate optical coupler 32-2 fulfils the role of a delay line that adds a time delay to the optical pulse that is input to the variable coupling rate optical coupler 32-2 at the same time as performing an operation to cause one of the optical pulses demultiplexed by the variable coupling rate optical coupler 32-1 to be propagated and input to the variable coupling rate optical coupler 32-2 that is installed downstream of the variable coupling rate optical coupler 32-1. The optical waveguides that link the adjacent variable coupling rate optical couplers such as the optical waveguide 38-2 between the variable coupling rate optical coupler 32-2 and variable coupling rate optical coupler 32-3 all perform the same operation as delay lines.

For the optical pulse that is demultiplexed by the variable coupling rate optical coupler 32-1 and input to the optical waveguide 38-1, another optical pulse is input to the phase modulator 34-1 constituting the phase modulator 34 to modulate the phase of the optical pulse before same is input to a multiplexing section 36. Likewise, the optical pulses that have been demultiplexed by the variable coupling rate optical coupler section 32 have the phase modulated by the phase modulators 34-2 to 34-15 before being input to the multiplexing section 36. Therefore, there are a total of 15 optical pulses input to the multiplexing section 36 via the phase modulation section 34, where each optical pulse constitutes a chip pulse for the input optical pulse $P_{in}$.

Here, the chip pulse that is input to the multiplexing section 36 is multiplexed and the chip pulse string $P_{out}$ is output as the result of the input optical pulse $P_{in}$ being encoded. As mentioned earlier, phase modulation is performed such that the phase relationship of the fifteen optical pulses in the phase modulation section 34 satisfy the relationships shown in Tables 1 and 2. Therefore, each one of the respective chip pulses constituting the chip pulse string $P_{out}$ output by the transversal-type optical filter shown in FIG. 2B corresponds one-on-one with each of the code values constituting the code written as (0,0,0,1,1,1,1,1,0,1,0,1,1,0,0,1) as a 15-bit code string.

The 14 variable coupling rate optical coupler that constitute the variable coupling rate optical coupler section 32 fulfils the role of demultiplexing the input optical pulse $P_{in}$ to produce 15 (=14+1) optical pulses as mentioned earlier. That is, 15 optical pulses of which the intensity is kept equal must be generated by the 14 variable coupling rate optical couplers constituting the variable coupling rate optical coupler section 32. As a result, the respective branching ratios for the 14 variable coupling rate optical couplers must be set by changing the branching ratio a little at a time. For example, the branching ratio of the variable coupling rate optical coupler 32-1 must be 1:14 and the branching ratio of the variable coupling rate optical coupler 32-2 must be 1:13. Likewise, the respective branching ratios of the variable coupling rate optical couplers 32-3, . . . , 32-14 must be 1:12, 1:11, . . . 1:1.

Therefore, the constitution of the variable coupling rate optical couplers 32-1 to 32-14 that constitute the variable coupling rate optical coupler section 32 as well as the operating principles thereof will be described with reference to FIG. 2A. Although, for the sake of expediency in the description, the functions and constitution are described by taking the variable coupling rate optical coupler 32-1 constituting the variable coupling rate optical coupler section 32 of the transversal-type optical filter shown in FIG. 2B as an example, the other variable coupling rate optical couplers 32-2 to 32-14 and so forth also have the same constitution and functions.

As shown in FIG. 2A, the variable coupling rate optical coupler 32-1 comprises two input ports 48 and 50 and two output ports 52 and 54 and is constituted comprising a first directional optical coupler 40, a second directional optical coupler 42, a first phase shifter 44, and a second phase shifter 46.

Suppose that the optical pulse that is input to the variable coupling rate optical coupler 32-1 is optical pulse $P_1$, the optical pulse that is output by the variable coupling rate optical coupler 32-1 and input to the variable coupling rate optical coupler 32-2 that is installed downstream of the variable coupling rate optical coupler 32-1 is optical pulse $P_2$, and the optical pulse that is input to the phase modulator 34-1 is optical pulse $P_3$. The optical pulse $P_1$ is input to an input port 48 that the variable coupling rate optical coupler 32-1 comprises. The optical pulse $P_1$ is then split into two by the first directional optical coupler 40 to produce the first optical pulse $P_{1\text{-}1}$ and second optical pulse $P_{1\text{-}2}$ which are input to the first phase shifter 44 and a second phase shifter 46 respectively.

The optical pulses that are input to the first phase shifter 44 and the second phase shifter 46 have their phases modulated to generate a modulated first optical pulse $P_{1\text{-}1}'$ and a modulated second optical pulse $P_{1\text{-}2}'$ which are then input to the second directional optical coupler 42 and multiplexed thereby before being split into two once again to then be output as optical pulses $P_2$ and $P_3$.

The two optical pulses input to the second directional optical coupler 42, the modulated first optical pulse $P_{1\text{-}1}'$ and the modulated second optical pulse $P_{1\text{-}2}'$ have their phases modulated by the first phase shifter 44 and the second phase shifter 46 respectively. As a result, the branching ratio when both are input to the second directional optical coupler 42 and then multiplexed before being split into two (the intensity ratio of $P_2$ and $P_3$, $P_2:P_3$) is not 1:1 but rather 1:14. The determination of the branching ratio is the phase difference between the modulated first optical pulse $P_{1\text{-}1}'$ and the modulated second optical pulse $P_{1\text{-}2}'$. The phase modulation amount produced by the first phase shifter and the second phase shifter of the 14 variable coupling rate optical couplers constituting the variable coupling rate optical coupler section 32 is adjusted so that the phase difference is suitably adjusted and splitting occurs to establish the required branching ratio.

The first phase shifter and second phase shifter are formed having a constitution such that the temperature of the optical waveguide of this part can be adjusted. That is, heaters are formed with the cladding layer 31 above the core 33 interposed therebetween. Heaters are formed in the rectangular parts shown shaded in FIG. 2A. When the core 33 is heated by the heaters, the refractive index of the core 33 is large. For example, when the core 33 is formed by Ge-doped $SiO_2$, the refractive index changes by $8 \times 10^6$ for each 1° C. for an optical pulse of wavelength 1.55 µm. When the constitution is such that the phase shifter has a structure enabling the temperature of the optical waveguide part of length 1 mm to be controlled, the optical path length of this part is made 0.388 µm long by raising the temperature by 33.5° C. That is, this results in the wavelength of an optical pulse of wavelength 1.55 µm corresponding to a ¼ wavelength and phase modulation corresponding to $\pi/2$ when converted to a phase can be performed.

In order to change the branching ratio of the second directional optical coupler 42 from 1:0 to 1:1, modulation of the phase difference of the first optical pulse $P_{1\text{-}1}$ and second optical pulse $P_{1\text{-}2}$ by the first phase shifter and second phase shifter from 0 to $\pi/2$ can be implemented. That is, this is because implementation is possible as long as the temperature of the optical waveguide part formed as a phase shifter can be adjusted on the order of 30° C., which is a temperature adjustment value that can be implemented easily.

Diffraction Grating

In addition to using the abovementioned transversal-type optical filter, the phase control means can also be implemented by arranging a plurality of diffraction gratings in series in the waveguide direction of the optical waveguide (in a number equal to the codelength). The optical pulse input to the optical waveguide is reflected (Bragg-reflected) as a result of reaching the point where the diffraction gratings are arranged and the reflected light takes the form of chip pulses. That is, chip pulses equal to the number of diffraction gratings arranged in the waveguide are generated. As a result, if the number of arranged diffraction gratings and the codelength of the codes to be set are equal, the individual diffraction gratings and the chips constituting the codes can be made to correspond with one another one-on-one.

Each of the plurality of diffraction gratings arranged in the optical waveguides is also called a unit diffraction grating. This makes it possible to regard the plurality of diffraction gratings arranged in the optical waveguide as a whole as a diffraction grating. Therefore, in order to make a distinction from a diffraction grating that constitutes a plurality of diffraction gratings, individual diffraction gratings can also be called unit diffraction gratings.

The practice of achieving one-for-one correspondence between the individual diffraction gratings arranged in the optical waveguide and the chips constituting the codes may be performed as follows. That is, settings are made so that the phase difference of the Bragg reflected light from two unit diffraction gratings that are adjacent and provide equal code values is given by Equation (1) above and the phase difference of Bragg reflected light from two unit diffraction gratings that are adjacent and provide different code values is given by Equation (2) above. That is, the relationships of each of the phases of the Bragg reflected light (chip pulses) constituting the chip pulse string are established to render the relationships shown in Tables 1 and 2.

A PLC may be used as the optical waveguide but optical fiber is preferably used. This is because an SSFBG whose fabrication technology is already established can be used by adopting optical fiber as the optical waveguide. This is also because optical fiber is used as the optical transmission line in optical communication systems. That is, if the optical pulse time spreading device of the present invention is used as an OCDM encoding device and decoding device, the connection between the OCDM encoding device and decoding device and the optical transmission line is made using optical fibers. Further, the connection of the optical fibers is straightforward in each stage in comparison with a case where a connection is made between optical fiber and a non-optical fiber optical waveguide such as a PLC.

SSFBG

Therefore, an example in which an SSFBG is used as phase control means for setting codes for optical pulse time spreaders constituting the optical pulse time spreading device will be described next.

Figure 3A:
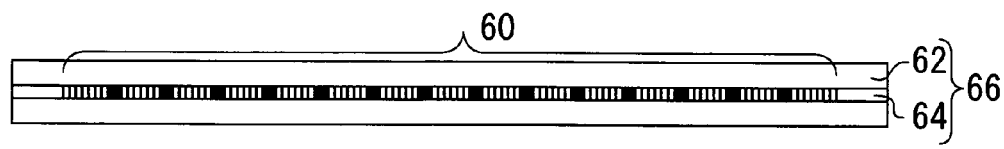
FIGS. 3A-3B are schematic structural diagrams of phase control means that use an SSFBG.

The schematic structure of phase control means that use an SSFBG will now be described with reference to FIGS. 3A and 3B. FIG. 3A is a schematic cross-sectional view of the phase control means. The phase control means has a structure in which an SSFBG 60 is fixed to a core 64 of an optical fiber 66 comprising the core 64 and cladding 62. The SSFBG 60 is constituted such that 15 unit FBGs are arranged in series in the waveguide direction of the core 64 constituting the optical waveguide of the optical fiber 66.

The optical phase code which is set for the phase control means shown in FIG. 3A is the same 15-bit optical phase code mentioned above. Further, the correspondence relationship between the abovementioned optical code and the 15 unit FBGs arranged in series in the core 64 of the optical fiber 66 is as follows. That is, the unit FBGs, which are arranged in a direction extending from the left end to the right end of the SSFBG 60 shown in FIG. 3A and the chips, which are arranged in a direction extending from the left end to the right end of (0,0,0,1,1,1,1,0,1,0,1,1,0,0,1) that represents the optical codes of the unit FBGs noted as the abovementioned 15-bit code string correspond with one another one-on-one.

Figure 3B:
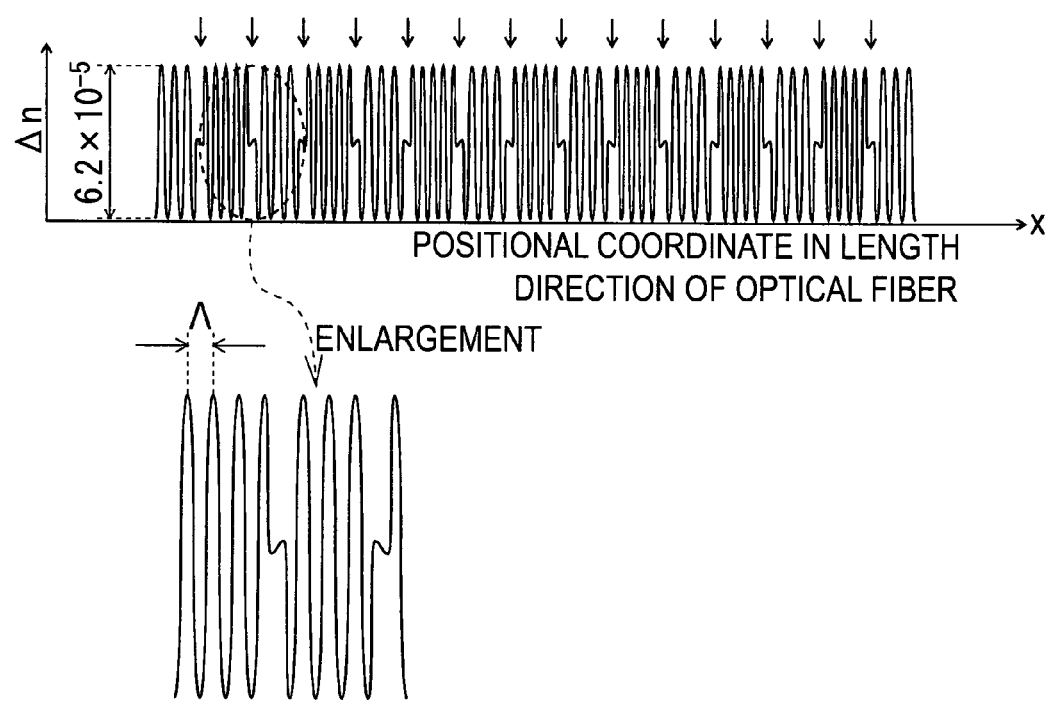

FIG. 3B schematically shows the refractive index modulation structure of the SSFBG 60 shown in FIG. 3A. The horizontal axis is a position coordinate in the longitudinal direction of the optical fiber 66 forming the SSFBG 60. The vertical axis represents the refractive index modulation structure of the optical fiber 66 and the difference between the maximum and minimum of the refractive index of the core of the optical fiber 66 is represented as Δn, which is Δn=6.2×$10^{-5}$. Further, in FIG. 3B, the refractive index modulation structure of the core 64 of the optical fiber 66 is drawn partially enlarged.

The refractive index modulation cycle is Λ. Therefore, the Bragg reflected wavelength λ is given by λ=2NeffΛ. Here, $N_{eff}$ is the effective refractive index of the optical fiber 66. The refractive index modulation cycle Λ of the SSFBG 60 shown here is 535.2 nm. Further, the wavelength λ of the encoded or decoded optical pulse is 1550 nm and the effective refractive index of the optical fiber 66 is 1.448. Therefore, the Bragg reflected wavelength is set at 1550 nm, which is equal to the wavelength λ of the optical pulse. That is, because the λ=1550 nm, $N_{eff}$=1.448, Λ=535.2 nm, λ=2$N_{eff}$Λ=2×1.448×535.2 nm=1549.94 nm≈1550 nm is satisfied. Further, the length of the unit FBG is set as 2.4 mm.

The optical pulse that is input to the SSFBG that comprises 15 unit FBGs is split into 15 optical pulses. The respective optical pulses resulting from this split into 15 optical pulses have respectively different phases as a result of the optical pulses generated after being Bragg-reflected by any unit FBG among the unit FBGs constituting the SSFBG. Further, as mentioned earlier, the unit FBGs, which are arranged in a direction extending from the left end to the right end of the SSFBG 60 shown in FIG. 3A, and the chips, which are arranged in a direction from the left end to the right end of the code (0,0,0,1,1,1,0,1,0,1,1,0,0,1) correspond one-on-one.

In FIG. 3A, the intervals between adjacent unit FBGs are shown shaded black. On the other hand, in FIG. 3B, the intervals between adjacent unit FBGs are shown by adding down-facing arrows. When the intervals between adjacent unit FBGs that are shown by adding down-facing arrows are described by assuming a case of an SSFBG that constitutes an ith optical pulse time spreader (i=1, 2, . . . 5), for example, the following is true.

That is, the Bragg reflected light from 15 unit FBGs constituting an SSFBG constitutes a chip pulse string and, therefore, the intervals between adjacent unit FBGs are established such that the phase relationships of the Bragg reflected light from each of the 15 unit FBGs are represented by the values recorded in the rows shown by 'i' (i=1, 2, . . . 5) in Tables 1 and 2. More specifically, the phase difference of the Bragg reflected light from the adjacent unit FBGs is represented by a value corresponding to two times the optical path length between the unit FBGs shown by adding down-facing arrows. That is, the phase difference of the Bragg reflected light from the adjacent unit FBGs is equal to the additional phase difference as a result of light being propagated over the distance equal to two times the optical path between adjacent unit FBGs. Therefore, the optical path difference between unit FBGs shown by adding down-facing arrows may be established to correspond to the phase difference of half the phase value recorded in the rows denoted by 'i' in Table 1 (i=1, 2, . . . 5).

Characteristic Evaluation Experiment of Phase Control Means

The content of an experiment in which the operating characteristics of the optical pulse time spreading device was evaluated as well as the results thereof will be described with reference to FIGS. 4 to 7.

Figure 4:
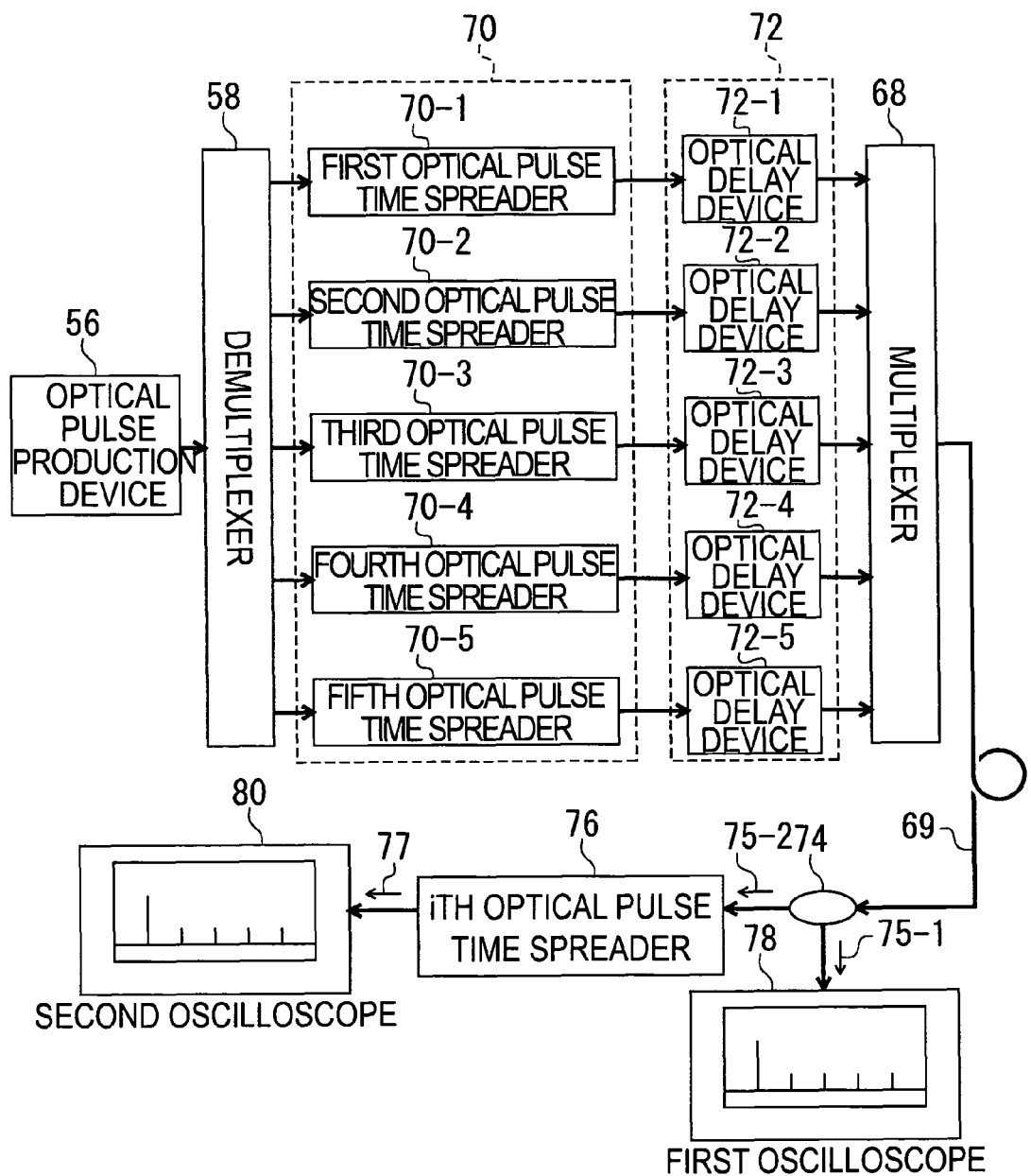
FIG. 4 is a schematic block constitutional diagram of a device that performs a characteristic evaluation of the optical pulse time spreading device.

A schematic diagram of a device used in the evaluation of the operating characteristics of the optical pulse time spreading device is shown in FIG. 4. This device comprises an optical pulse production device 56, a demultiplexer 58, a multiplexer 68, an optical delay section 72, a first oscilloscope 78 and a second oscilloscope 80. The optical pulse outputted by the optical pulse production device 56 has a wavelength of 1.55 μm and a half width of 20 ps. The optical pulse output by the optical pulse production device 56 is demultiplexed by the demultiplexer 58 and then input to an optical pulse time spreading device 70 constituting the evaluation target.

The optical pulse time spreading device 70 constituting the evaluation target that is employed is one constituted comprising a first optical pulse time spreader 70-1, a second optical pulse time spreader 70-2, a third optical pulse time spreader 70-3, a fourth optical pulse time spreader 70-4, and a fifth optical pulse time spreader 70-5, as shown in FIG. 4. The first to fifth optical pulse time spreaders are optical pulse time spreaders implemented by the SSFBG above. When a 15-bit code string is written for each of the first to fifth optical pulse time spreaders 70-1 to 70-5 constituting the optical pulse time spreading device 70, a code given as (0,0,0,1,1,1,1,0,1,0,1,1,0,0,1) is established. Further, the parameters M and N that provide phase difference φA and φB between the generated chip pulses are established as M=N=0.

First, the chip pulse string generated by the first to fifth optical pulse time spreaders was observed by setting the identification parameters as $a_1$=0, $a_2$=0.4, $a_3$=0.8, $a_4$=1.2, and $a_5$=1.6. Further, by allowing the first to fifth optical pulse time spreaders to function as a decoder, the cross-correlation waveform and mutual correlation waveform were observed from the chip pulse string.

The optical delay section 72 is constituted comprising a first optical delay device 72-1, a second optical delay device 72-2, a third optical delay device 72-3, a fourth optical delay device 72-4, and a fifth optical delay device 72-5. The reason why the optical delay section 72 is provided downstream of the optical pulse time spreading device 70 is because it can be observed through differentiation on the time axis whether the optical pulse has been time-spread by any of the optical pulse time spreaders installed in the optical pulse time spreading device 70.

That is, the optical delay device 72-1 provides a favorable time delay for an evaluation experiment to the chip pulse string that is time-spread by the first optical pulse time spreader 70-1. This value may be 0 and is optionally set in accordance with the usage circumstances of the first and second oscilloscopes, for example. The optical delay 72-2 provides a time delay that is required for observation through differentiation on the time axis to determine whether the optical pulse has been time-spread by any of the optical pulse time spreaders with respect to the chip pulse string that has been time-spread by the second optical pulse time spreader 70-2. In this experiment, a time difference on the order of 800 ps is presented. As a result, a chip pulse string that has been time-spread by the first optical pulse time spreader 70-1 and a chip pulse string that has been time-spread by the second optical pulse time spreader 70-2 can be output adjacently and separately without overlap on the time axis.

The optical delay devices 72-3, 72-4, and 72-5 also supply the time delay required for mutual identification to the series of chip pulses stream that are time-spread by the third optical pulse time spreader 70-3, the fourth optical pulse time spreader 70-4, and the fifth optical pulse time spreader 70-5. That is, the respective time delay amounts of the optical delay devices 72-3, 72-4, and 72-5 are set so that the series of chip pulses stream that have been time-spread by from the second optical pulse time spreader 70-2 to the fifth optical pulse time spreader 70-5 are output separately and in order, so that an overlap on the time axis is avoided.

The respective series of chip pulses stream that are output by the optical delay devices 72-1, 72-2, 72-3, 72-4, and 72-5 are multiplexed by the multiplexer 68, propagated by an optical fiber cable 69 constituting the transmission line, input to an optical coupler 74, and demultiplexed to produce a first optical signal 75-1 and a second optical signal 75-2. The time waveform of the first optical signal 75-1 is observed by means of the first oscilloscope 78. On the other hand, the second optical signal 75-2 is input to an ith optical pulse time spreader 76 (i=1, 2, 3, 4, 5) and output as a third optical signal 77 whose time waveform is observed by the second oscilloscope 80.

The ith optical pulse time spreader 76 (i=1, 2, 3, 4, 5) is an SSFBG optical pulse time spreader that is equal to any of the first optical pulse time spreader 70-1, second optical pulse time spreader 70-2, third optical pulse time spreader 70-3, fourth optical pulse time spreader 70-4, and fifth optical pulse time spreader 70-5 that constitute the optical pulse time spreading device 70. However, the input end and output end of the SSFBG constituting the ith optical pulse time spreader 76 (i=1, 2, 3, 4, 5) are established the other way around from the input end and output end of the SSFBG of the optical pulse time spreader constituting the optical pulse time spreading device 70. That is, as described with reference to FIG. 1, an evaluation experiment on the operating characteristics of the optical pulse time spreading device was performed by selecting the SSFBG constituting the optical pulse time spreading device 70 as the encoder and the SSFBG constituting the ith optical pulse time spreader 76 (i=1, 2, 3, 4, 5) as the decoder.

Figure 5:
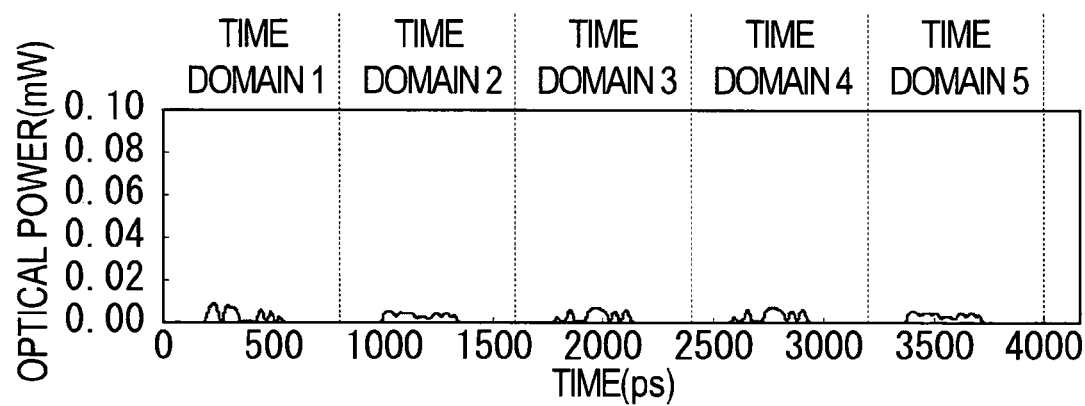
FIG. 5 shows the time waveform of a first optical signal.

FIG. 5 shows a time waveform of the first optical signal 75-1 observed by the first oscilloscope 78. The horizontal axis in FIG. 5 is shown calibrated in ps units and the vertical axis is represents the optical power calibrated in mW units. The first optical signal 75-1 is an optical signal rendered by multiplexing the respective series of chip pulses stream that are output by the optical delay devices 72-1, 72-2, 72-3, 72-4, and 72-5 which is output by the multiplexer 68. That is, the time waveform of the first optical signal 75-1 is produced by causing the time waveforms of the series of chip pulses stream generated by the first to fifth optical pulse time spreaders to stand in a row at equal intervals (800 ps intervals) on the time axis.

That is, the time waveform that appears in a time domain 1 (a range of 0 ps to 800 ps) shown in FIG. 5 represents a time waveform of a chip pulse string of an optical pulse rendered by intensity-dividing an optical pulse output by the optical pulse production device 56 by the demultiplexer 58 and encoding the optical pulse by means of the first optical pulse time spreader 70-1. Further, the time waveform appearing in a time domain 2 (range of 800 ps to 1600 ps) represents a time waveform of a chip pulse string of an optical pulse rendered by intensity-dividing the optical pulse output by the optical pulse production device 56 by the demultiplexer 58 and encoding the optical pulse by means of the second optical pulse time spreader 70-2. Likewise, the time waveforms that appear in a time domain 3 (range of 1600 ps to 2400 ps), a time domain 4 (range of 2400 ps to 3200 ps) and a time domain 5 (range of 3200 ps to 4000 ps) represent time waveforms of series of chip pulses stream of optical pulses rendered by intensity-dividing the optical pulse output by the optical pulse production device 56 by the demultiplexer 58 and encoding the optical pulse by means of the third optical pulse time spreader 70-3, fourth optical pulse time spreader 70-4, and fifth optical pulse time spreader 70-5.

As shown in FIG. 5, it can be seen that the optical pulses are time-spread to produce a series of chip pulses stream by means of the first to fifth optical pulse time spreaders respectively. Although the code set for each of the first to fifth optical pulse time spreaders is the same, the identification parameters a (i=1, 2, 3, 4, 5) of the optical pulse are different and, therefore, the time waveforms of the strings of chip pulses appearing in time domains 1 to 5 are different from one another.

The time waveform of the third optical signal 77 observed by the second oscilloscope 80 is shown next with reference to FIGS. 6A to 6E. The third optical signal 77 is an optical signal that is output by the ith optical pulse time spreader 76 (i=1, 2, 3, 4, 5) as a result of the second optical signal 75-2 produced by multiplexing the strings of respective chip pulses generated by the first to fifth optical pulse time spreaders being generated as a cross-correlation waveform component and a mutual correlation waveform component.

Figure 6A:
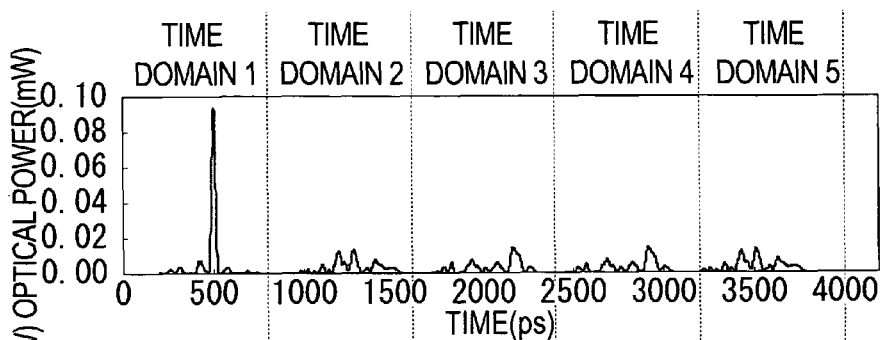
FIGS. 6A-6E show the time waveforms of a second optical signal.
Figure 6B:
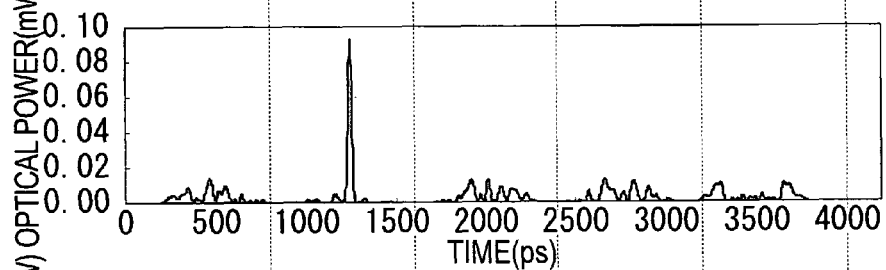
Figure 6C:
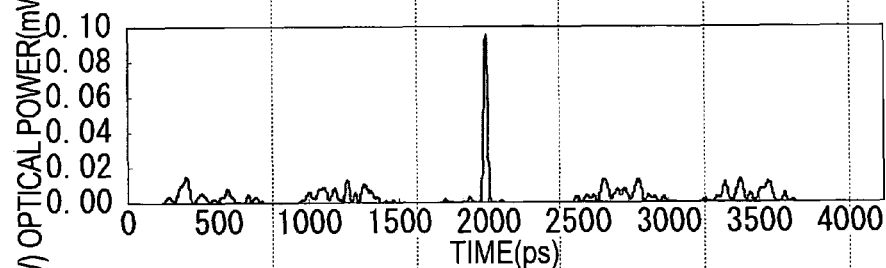
Figure 6D:
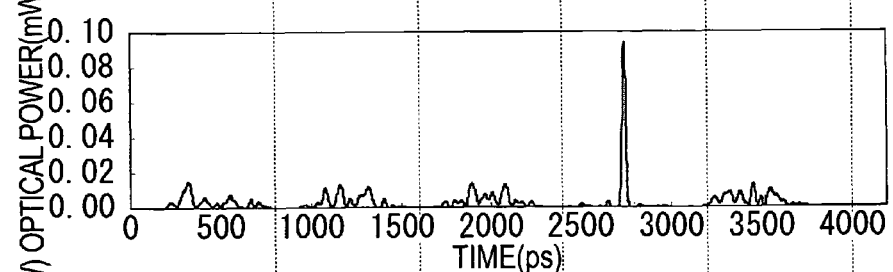
Figure 6E:
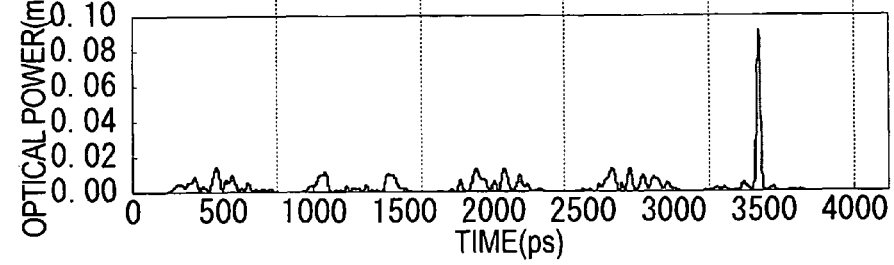

FIG. 6A shows a time waveform of the third optical signal 77 that is observed by establishing an optical pulse time spreader comprising an SSFBG that is equal to the first optical pulse time spreader 70-1 constituting the optical pulse time spreading device 70 as the ith optical pulse time spreader 76 (i=1, 2, 3, 4, 5). Likewise, FIGS. 6B to 6E show the time waveform of the third optical signal 77 that is observed by establishing optical pulse time spreaders comprising an SSFBG that are equal to the second to fifth optical pulse time spreaders (70-2 to 70-5) that constitute the optical pulse time spreading device 70 as the ith optical pulse time spreader 76 (i=1, 2, 3, 4, 5).

The following is clear from the time waveforms shown in FIG. 6A. That is, a cross-correlation waveform is played back in time domain 1 and a mutual correlation waveform is generated in the time domains other than time domain 1. The time waveforms shown in FIG. 6A are time waveforms observed by establishing an optical pulse time spreader comprising an SSFBG that is equal to the first optical pulse time spreader 70-1 constituting the optical pulse time spreading device 70 as the ith optical pulse time spreader 76 (i=1, 2, 3, 4, 5). This therefore means that, in the chip pulse string contained in the second optical signal 75-2, only the component that has been time-spread by the first optical pulse time spreader 70-1 is played back as the cross-correlation waveform by the ith optical pulse time spreader 76.

The peak intensity of the cross-correlation waveform played back in time domain 1 is sufficiently large in comparison with the peak intensity of the cross-correlation waveforms generated in the time domains other than time domain 1. Therefore, if threshold value processing is performed on the second optical signal 75-2, only the cross-correlation waveform can be adequately extracted.

The conclusion can be drawn that the time waveforms shown in FIGS. 6B to 6E are also the same as the time waveforms shown in FIG. 6A above. The time waveforms shown in FIGS. 6B to 6E are time waveforms observed by establishing an optical pulse time spreader comprising an SSFBG that is equal to the second to fifth optical pulse time spreaders (70-2 to 70-5) constituting the optical pulse time spreading device 70 as the ith optical pulse time spreader 76.

The following is clear from the time waveforms shown in FIGS. 6B, 6C, 6D, and 6E. That is, a cross-correlation waveform is played back in time domains 2, 3, 4, and 5 and a mutual correlation waveform is generated in the time domains other than time domains 2, 3, 4, and 5. The time waveforms shown in FIGS. 6B, 6C, 6D, and 6E are time waveforms observed by establishing optical pulse time spreaders comprising an SSFBG that are equal to the second to fifth optical pulse time spreaders (70-2 to 70-5) constituting the optical pulse time spreading device 70 respectively as the ith optical pulse time spreader 76 (i=1, 2, 3, 4, 5). This therefore means that, in the respective series of chip pulses stream contained in the second optical signal 75-2, only the component that has been time-spread by the second to fifth optical pulse time spreaders (70-2 to 70-5) is played back as the cross-correlation waveform by the ith optical pulse time spreader 76.

The peak intensity of the cross-correlation waveforms played back in time domains 2, 3, 4, and 5 is sufficiently large in comparison with the peak intensity of the cross-correlation waveform generated in time domains other than time domains 2, 3, 4, and 5. Therefore, with respect to each of the time waveforms shown in FIGS. 6B to 6E, only the component that is time-divided by the second to fifth optical pulse time spreaders (70-2 to 70-5) in the chip pulse string contained in the second optical pulse signal 75-2 is played back as a cross-correlation waveform by the ith optical pulse time spreader 76.

The conclusion can be drawn that the time waveforms shown in FIGS. 6B to 6E are also the same as the time waveforms shown in FIG. 6A above. That is, with respect to each of the time waveforms shown in FIGS. 6B to 6E, only the component that is time-divided by the second to fifth optical pulse time spreaders (70-2 to 70-5) in the chip pulse string contained in the second optical pulse signal 75-2 is played back as a cross-correlation waveform by the ith optical pulse time spreader 76. Therefore, similarly to the time waveform shown in FIG. 6A, if threshold value processing is performed, only the cross-correlation waveform can be adequately extracted.

It was ascertained from these experiment results that the optical pulse time spreading device of the present invention can be used as an encoder for encoding an optical pulse signal and can be used as a decoder for decoding an encoded optical pulse signal that has been generated as an encoded signal.

In the evaluation experiment described above, identification parameters are set as $a_1=0$, $a_2=0.4$, $a_3=0.8$, $a_4=1.2$, and $a_5=1.6$. That is, because $a2-a1=a3-a2=a4-a3=a5-a4=0.4$, the interval $\Delta a$ of the identification parameters is 0.4. As the identification parameters $\Delta a$ grow smaller, the interval on the time axis of the chip pulses forming a chip pulse string grows shorter and, therefore, the generation of a cross-correlation waveform becomes gradually more difficult. That is, as the interval $\Delta a$ of the identification parameters grows smaller, the difference between the peak intensities of the cross-correlation waveform and the mutual correlation waveform played back or generated from the chip pulse string grows smaller.

Figure 7:
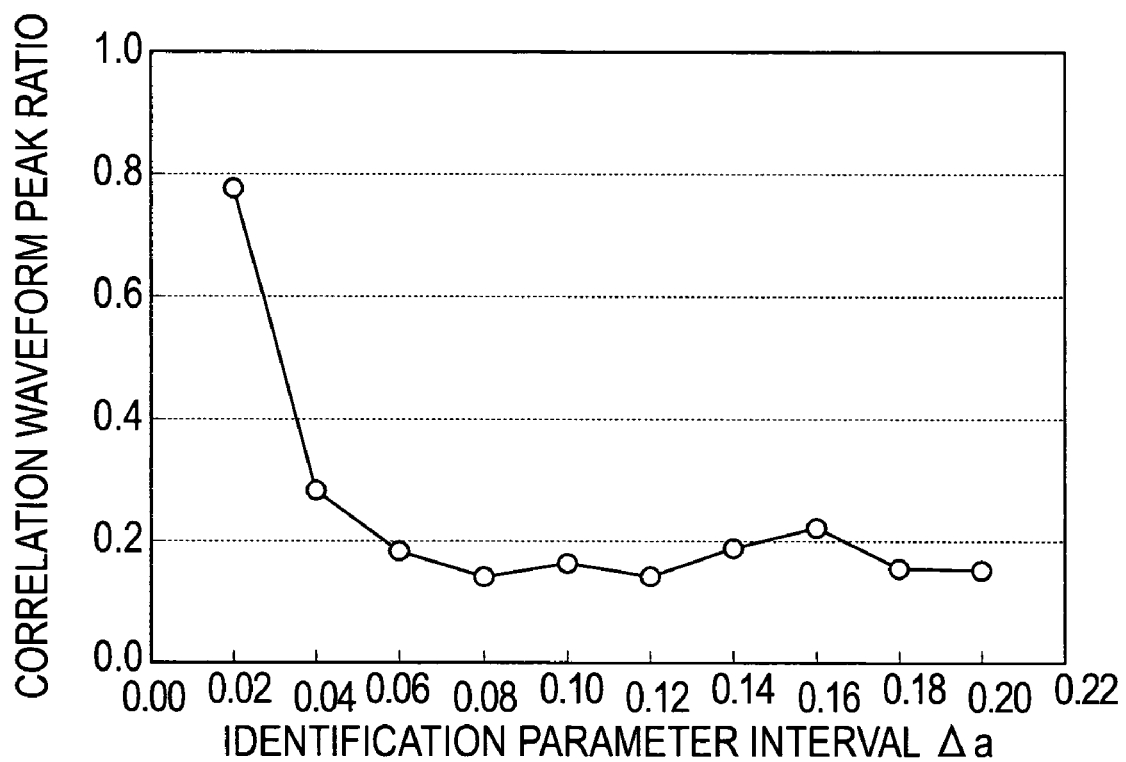
FIG. 7 is a graph showing the relationship of the ratio of the correlation waveform intensity with respect to an interval Δa of an identification parameter.

Therefore, FIG. 7 shows the results of investigating the correlation waveform intensity ratio produced by normalizing the peak intensity of the mutual correlation waveform by means of the peak intensity of the cross-correlation waveform with respect to the interval $\Delta a$ of the identification parameters. The correlation waveform intensity ratio is, in other words, a value produced by dividing the peak value of the mutual correlation waveform by the peak value of the cross-correlation waveform. Therefore, if the mutual correlation waveform component is 0, the correlation waveform intensity ratio is 0 and, if the cross-correlation waveform component and mutual correlation waveform component are equal, the correlation waveform intensity ratio is 1. That is, this means that, as the mutual waveform intensity ratio approaches 1, it becomes difficult to separate the cross-correlation waveform component from the mutual correlation waveform component.

The horizontal axis in FIG. 7 represents the value of the interval $\Delta a$ of the identification parameters and the vertical axis represents the correlation waveform peak ratio. FIG. 7 shows the correlation waveform peak ratio over a range where the value of the interval $\Delta a$ of the identification parameters is a value of 0.02 to 0.20. It can be seen that, if the value of the interval $\Delta a$ of the identification parameters is larger than 0.06, the correlation waveform peak ratio is on the order of 0.2. That is, this signifies that the peak value of the mutual correlation waveform is on the order of $\frac{1}{5}$ the peak value of the cross-correlation waveform. It can be seen that, if the value of the interval $\Delta a$ of the identification parameters is set larger than 0.06, separation of the cross-correlation waveform component from the mutual correlation waveform component is sufficiently feasible by means of a method such as threshold value processing.

Naturally, the lower limit value of the value of the interval $\Delta a$ of the identification parameters depends on the performance of the device performing threshold value processing or the like. Further, the lower limit value also depends on the wavelength of the optical pulse and the half width thereof and so forth. Hence, the decision of what kind of value to establish as the value of the interval $\Delta a$ of the identification parameters is a design item when designing an OCDM device that uses an optical pulse time spreading device.

Further, although the abovementioned evaluation experiment was performed with the wavelength of the optical pulse as 1.55 µm and the half width as 20 ps, it is clear that the optical pulse time spreading device of the first invention is also capable of executing a similar operation under different conditions. That is, by designing the Bragg wavelength of the unit FBG set for the SSFBG constituting the phase control means of the optical pulse time spreader to match the wavelength of the optical pulse, an operation with the same optical pulse time spreading can also be implemented for optical pulses in principle of any kind of wavelength. Furthermore, although the experiment was performed with the half width set at 20 ps, the fact that a more favorable characteristic is obtained as the half width narrows is the same for conventional types of optical pulse time spreader. Therefore, an optical pulse time spreading operation or similar that is the same in principle can be implemented even in a case where the half width of the optical pulse is 20 ps and different.

As described earlier, it was possible to implement an optical pulse time spreading device capable of performing a plurality of identifiable optical phase encoding by using one type of code. That is, it was shown that it was possible to implement S different optical phase encodings by introducing a plurality of S different identification parameters $a_i$ (i=1, 2, ... S) for one type of code. It was therefore ascertained that, by adopting the optical pulse time spreading device of the present invention as an OCDM encoder and decoder, a plurality of channels were capable of optical code division multiplexing transmission.

OCDM Transmission Method and Device Thereof

The optical pulse time spreading device of the present invention is preferably applied to optical code division multiplexing transmission methods ('OCDM transmission method' hereinbelow). That is, the OCDM transmission method of the present invention that includes the following steps can be implemented by adopting the optical pulse time spreading device of the present invention as an encoder and a decoder. The OCDM transmission method of the present invention is a method that is capable of performing optical multiplexing transmission on a plurality of channels with respect to the same code as mentioned earlier.

The OCDM transmission method of the present invention includes an encoding step and a decoding step. Further, an encoding step and decoding step are executed by using the optical pulse time spreading device of the present invention. The encoding step is an encoding step that generates an optical pulse signal as an encoded optical pulse signal by performing encoding by using optical phase code. The decoding step is a decoding step that generates a cross-correlation waveform of the optical pulse signal by decoding the encoded optical pulse signal by using the same code and the same identification parameters as the optical phase code used in the encoding step.

The above OCDM transmission method can be implemented by the optical code division multiplexing transmission device (called 'OCDM transmission device' hereinbelow) of the present invention that comprises an encoder and a decoder. That is, the OCDM transmission device of the present invention uses the optical pulse time spreading device of the present invention as the encoder and decoder.

The encoder implements an encoding step that generates an optical pulse signal as an encoded optical pulse signal by performing encoding by using optical phase code. The decoder implements a decoding step that generates a cross-correlation waveform of the optical pulse signal by decoding the encoded optical pulse signal by using the same code and same identification parameters as the optical phase code.

Figure 8:
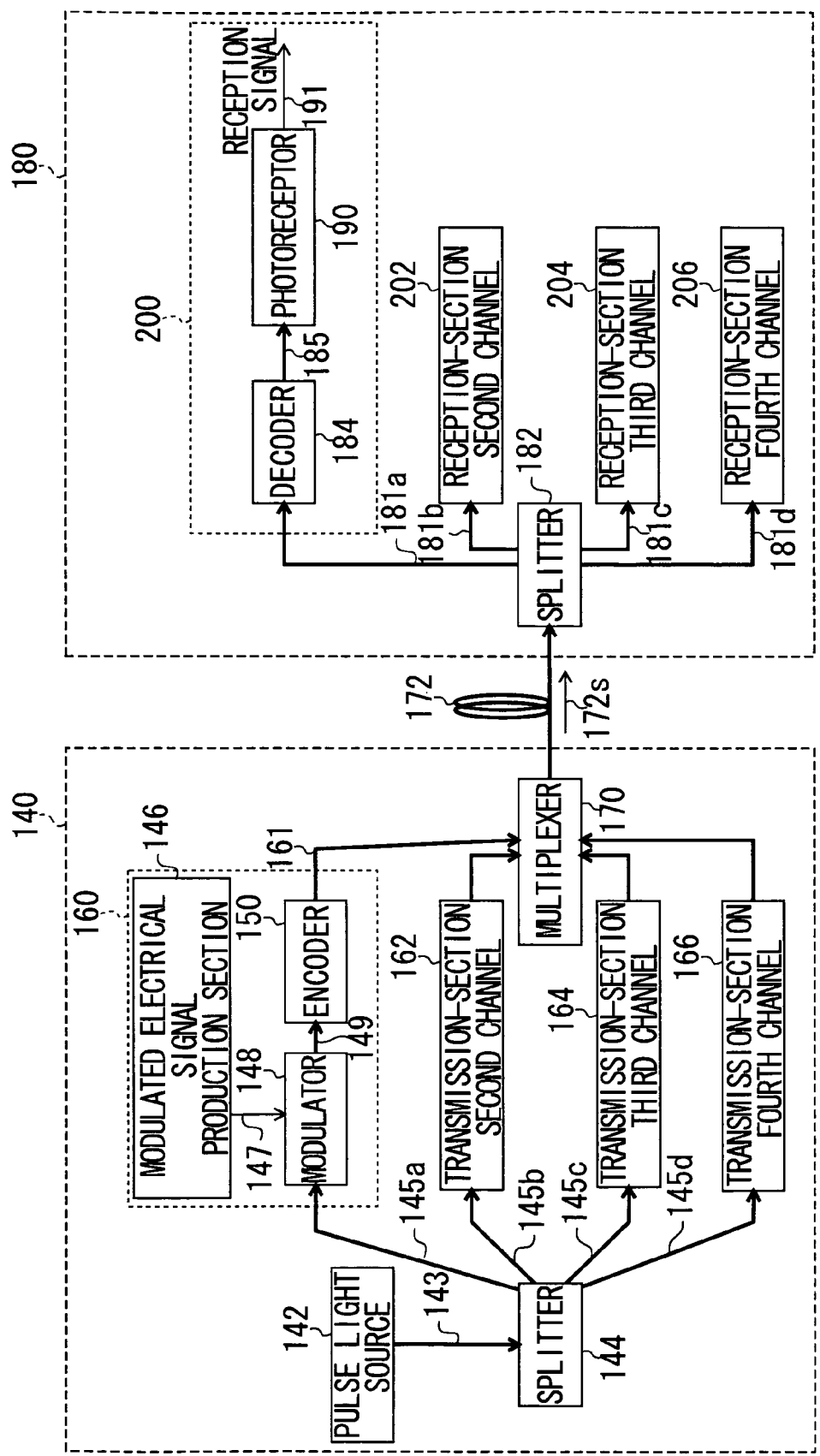
FIG. 8 is a schematic block constitutional diagram of an OCDM transmission device.

The constitution and function of the OCDM transmission device of the present invention will now be described with reference to FIG. 8. FIG. 8 is a schematic block constitutional diagram of the OCDM transmission device of the present invention. FIG. 8 shows paths of optical signals such as optic fibers by means of bold lines and shows the paths of electrical signals by means of narrow lines. Further, the numbers assigned to these bold lines and narrow lines signify optical signal or electrical signals that are propagated by the respective paths in addition to indicating the paths themselves.

An optical pulse time spreading device that is used as an encoder and decoder by the OCDM transmission device of the present invention is formed as follows. That is, the codes set for the respective optical pulse time spreaders constituting the optical pulse time spreading device of the present invention are the same. Further, four different types $a_1$, $a_2$, $a_3$, and $a_4$ of identification parameters that provide the phase difference $\phi A$ and phase difference $\phi B$ between the chip pulses generated by each of the optical pulse time spreaders are selected. The selection of the identification parameters is determined by considering the performance of threshold value processing devices and the like as well as the wavelength and half width and so forth of the optical pulse used as the optical pulse signal, as mentioned earlier.

Furthermore, although an example with a 4-channel constitution is shown in FIG. 8, the OCDM transmission device of the present invention is not limited to four channels. The following description is equally valid irrespective of the number of channels. The number of channels that can be multiplexed depends on the performance of the threshold value processing device or the like constituting the OCDM of the present invention as well as the wavelength and half width of the optical pulse used as the optical pulse signal. However, with the results and so forth of the characteristic evaluation experiment of the present invention above and current technology permitting, 5 channels or more are possible by using the same code.

The OCDM transmission device of the present invention is constituted to generate an encoded optical pulse signal on each channel by means of a transmission section 140, multiplex the encoded optical pulse signals of all the channels by means of a multiplexer 170 and transmit a transmission signal 172s to a reception section 180 through propagation via an optical transmission line 172.

The transmission signal 172s, which is produced by multiplexing the encoded optical pulse signals of all the channels transmitted to the reception section 180, is intensity-divided in a number equal to the number of channels as encoded optical pulse signals by a splitter 182. Each of the intensity-divided encoded optical pulse signals 181a, 181b, 181c, and 181d that have been intensity-divided in this manner are input to a reception-section first channel 200, a reception-section second channel 202, a reception-section third channel 204, and a reception-section fourth channel 206 of the reception section 180.

First, the functional part that produces base optical pulse trains for generating optical pulse signals which are the transmission signals of each channel and supplies the optical pulse trains to the respective channels will be described. This part is constituted comprising a pulse light source 142 and a splitter 144.

The pulse light source 142 can be constituted by using a distributed feedback laser (DFB-LD), for example. The light source, which is constituted to convert continuous wave light output by the DFB-LD into an optical pulse train by means of an optical modulator (not shown) and to output the optical pulse train from one optical fiber end, is a pulse light source 142. The output light 143 of the pulse light source 142 is intensity-divided for a number of channels (four here) by the splitter 144 and distributed to the respective channels. That is, the output light 143 is intensity-divided as the optical pulse train 145a, optical pulse train 145b, optical pulse train 145c, and optical pulse train 145d and supplied to the first to fourth channels respectively.

Because the subsequent description of the encoding section is common to each channel, the description will be provided here by taking the first channel as an example. A transmission-section first channel 160, which is the encoding section of the first channel, is constituted comprising a modulated electrical signal production section 146, a modulator 148, and an encoder 150. The second channel 162, third channel 164, and fourth channel 166 have the same structure as the first channel 160. The difference lies with the identification parameter $a_i$ (i=1, 2, 3, 4) that is set for the encoder (optical pulse time spreader) that each channel comprises. The identification parameters $a_i$ are set differently for each channel. As a result, optical pulse signals can be sent and received independently for each channel. With the exception of the encoder, the first to fourth channels all have the same structure.

For the sake of expediency in the description, FIG. 8 has been drawn in such a way that it may be read that encoders are provided independently in each of the channels. However, in reality, the encoders provided in each of the channels are constituted as a set. That is, the encoders provided in each of the channels are constituted as encoding devices that are gathered in a number equal to the number of channels.

The transmission section first channel 160 is a part that executes an encoding step that encodes the optical pulse signal of the first channel by using the optical pulse time spreader (encoder) provided for use in the first channel to generate an encoded optical pulse signal.

As mentioned earlier, the required constituent elements for constituting the transmission-section first channel 160 are the modulated electrical signal production section 146, modulator 148, and encoder 150. An optical pulse time spreader comprising an SSFBG for which the identification parameter $a_1$ has been set is used as the encoder 150. Likewise, optical pulse time spreaders comprising an SSFBG for which the identification parameters $a_2$, $a_3$, and $a_4$ have been set are used as the encoders installed in the second, third, and fourth channels.

The modulated electrical signal production section 146 produces an electrical pulse signal 147 that bears a transmission signal. The electrical pulse signal 147 is an electrical signal that is generated as a binary digital electrical signal in which transmission information allocated to the first channel is reflected. The modulator 148 converts the optical pulse train 145a to an optical pulse signal 149 by means of the electrical pulse signal 147. The optical pulse train 145a is intensity-modulated to the RZ format that reflects the electrical pulse signal 147 by the modulator 148 and generated as the optical pulse signal 149.

The encoder 150 generates an encoded optical pulse signal 161 by encoding the optical pulse signal 149. Further, an optical pulse time spreader for which the same optical phase structure as the encoder 150 is set (identification parameter $a_1$ is set) is used as the decoder 184 that is provided in the reception-section first channel 200 of the reception section 180. That is, the decoder 184 decodes an encoded optical pulse signal 181a that has been intensity-divided and allocated to the first channel by using an optical pulse time spreader (decoder) for which the same identification parameter $a_1$ as the encoder of the first channel is set. As a result, the decoder 184 generates a playback optical pulse signal that contains the cross-correlation waveform component of the optical pulse signal of the first channel and the mutual correlation waveform component of the optical pulse signal of the second to fourth channels.

FIG. 8 has been drawn in such a way that it may be read that decoders are provided independently in each of the channels, as per the abovementioned encoder. However, in reality, the decoders provided in each of the channels are constituted as a set. That is, the decoders provided in each of the channels are constituted as decoding devices that are gathered in a number equal to the number of channels.

The decoder 184 converts a played back cross-correlation waveform component 185 into an electrical signal by means of a photoreceptor 190 to generate a reception signal 191 of the first channel. The waveform of the reception signal 191 is a signal that reflects the electrical pulse signal 147 output by the modulated electrical signal production section 146 that the transmission-section first channel 160 of the transmission section 140 comprises. Thus, the electrical pulse signal 147 that is to be transmitted via the first channel is received as the reception signal 191 of the first channel by the reception section 180.

So too in the case of the transmission-section second channel 202, third channel 204, and fourth channel 206 of the reception section 180, the respective encoded optical pulse signals are decoded in the same way as the reception section first channel 200 to generate respective cross-correlation waveforms. The process whereby the electrical pulse signals transmitted via the respective channels are generated from the cross-correlation waveform is the same and therefore, a description of this process is omitted here.

As described earlier, the OCDM transmission method of the present invention and the OCDM transmission device of the present invention are implemented by using the optical pulse time spreading device of the present invention. Therefore, the OCDM transmission method of the present invention and the OCDM transmission device of the present invention make it possible to allocate, with channel discrimination, a plurality of channels (four channels in the OCDM transmission device shown in FIG. 8) for the same code.

What is claimed is:

1. An optical pulse time spreading device comprising S optical pulse time spreaders where S is a natural number of 2 or more, that each output an optical pulse that is input to the optical pulse time spreader as a series stream of chip pulses that are sequentially arranged adjacent in time in accordance with an optical phase code, wherein the ith optical pulse time spreader, where i is a set of natural numbers from 1 to S, comprises phase control means that supplies phase differences between said adjacent chip pulses, when adjacent code values are equal, said phase control means supplies a phase difference of $2\pi M+a_i\pi$ between adjacent chip pulses corresponding with said code values; and when adjacent code values are different, said phase control means supplies a phase difference of $2\pi M+(2N+1)\pi+a_i\pi$ between adjacent chip pulses corresponding with said different code values, where M and N are integers and the identification parameter $a_i$ is a set of distinct real numbers that satisfies $0 \leq a_i \leq 2$, and $a_i \neq a_j$ when $i \neq j$, j is a set of natural numbers from 1 to S, and said ith optical pulse time spreader has the corresponding distinct real number for $a_i$.

2. An optical pulse time spreading device comprising S optical pulse time spreaders, where S is a natural number of 2 or more, that each output an optical pulse that is input to the optical pulse time spreader as a series stream of chip pulses that are sequentially arranged adjacent in time in accordance with an optical phase code, wherein the ith optical pulse time spreader, where i is a set of natural numbers from 1 to S, is phase control means that supplies phase differences between said adjacent chip pulses using unit Bragg diffraction gratings which correspond one-on-one with the code values constituting the optical phase code and which are arranged in series in an optical waveguide; and the phase control means supplies phase differences in the Bragg reflected light such that two adjacent unit diffraction gratings that correspond with equal code values supply a phase difference of $2\pi M+a_i\pi$ and two adjacent unit diffraction gratings that correspond with different code values supply a phase difference of $2\pi M+(2N+1)\pi+a_i\pi$, where M and N are integers and the identification parameter $a_i$ is a set of distinct real numbers that satisfies $0 \leq a_i < 2$, and $a_i \neq a_j$ when $i \neq j$, j is a set of natural numbers from 1 to S, and said ith optical pulse time spreader has the corresponding distinct real number for $a_i$.

3. The optical pulse time spreading device according to claim 2, wherein said optical waveguide is an optical fiber.

4. An optical code division multiplexing transmission device in which an encoding device and a decoding device are said optical pulse time spreading device according to claim 1, comprising:

an encoding device that generates an optical pulse signal as an encoded optical pulse signal by performing encoding by using an optical phase code; and a decoding device that generates a cross-correlation waveform of said optical pulse signal by decoding said encoded optical pulse signal by using the same code as said optical phase code.

5. An optical code division multiplexing transmission device in which an encoding device and a decoding device are said optical pulse time spreading device according to claim 2, comprising:

an encoding device that generates an optical pulse signal as an encoded optical pulse signal by performing encoding by using an optical phase code; and a decoding device that generates a cross-correlation waveform of said optical pulse signal by decoding said encoded optical pulse signal by using the same code as said optical phase code.

6. An optical code division multiplexing transmission device in which an encoding device and a decoding device are said optical pulse time spreading device according to claim 3, comprising:
- an encoding device that generates an optical pulse signal as an encoded optical pulse signal by performing encoding by using an optical phase code; and
- a decoding device that generates a cross-correlation waveform of said optical pulse signal by decoding said encoded optical pulse signal by using the same code as said optical phase code.

* * * * *